United States Patent
Devoti et al.

(10) Patent No.: US 12,003,311 B2
(45) Date of Patent: Jun. 4, 2024

(54) DYNAMIC CONTROL OF AN UNMANNED AERIAL VEHICLE USING A RECONFIGURABLE INTELLIGENT SURFACE

(71) Applicant: NEC Laboratories Europe GmbH, Heidelberg (DE)

(72) Inventors: Francesco Devoti, Heidelberg (DE); Placido Mursia, Heidelberg (DE); Vincenzo Sciancalepore, Heidelberg (DE); Xavier Costa-Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 324 days.

(21) Appl. No.: 17/341,404

(22) Filed: Jun. 8, 2021

(65) Prior Publication Data

US 2022/0321198 A1    Oct. 6, 2022

Related U.S. Application Data

(60) Provisional application No. 63/167,131, filed on Mar. 29, 2021.

(51) Int. Cl.
*H04B 7/145* (2006.01)
*B64C 39/02* (2023.01)
(Continued)

(52) U.S. Cl.
CPC ........... *H04B 7/145* (2013.01); *B64C 39/024* (2013.01); *H04W 16/28* (2013.01); *B64U 10/13* (2023.01); *B64U 2101/20* (2023.01)

(58) Field of Classification Search
CPC ..... B64C 39/024; H04W 16/28; B64U 10/13; B64U 2101/20; H04B 7/15528
See application file for complete search history.

(56) References Cited

U.S. PATENT DOCUMENTS

| 10,277,299 B2 | 4/2019 | Moshfeghi |
| 2009/0300150 A1* | 12/2009 | Rudy ................. H04L 63/1425 709/222 |

(Continued)

FOREIGN PATENT DOCUMENTS

| CN | 110278017 A | 9/2019 |
| CN | 111464223 A | 7/2020 |
| CN | 112332548 A | 2/2021 |

OTHER PUBLICATIONS

Alfattani, Safwan et al., "Link Budget Analysis for Reconfigurable Smart Surfaces in Aerial Platforms," *arXiv*, US, pp. 1-6, Aug. 27, 2020, arXiv:2008.12334.

(Continued)

*Primary Examiner* — Fred A Casca
(74) *Attorney, Agent, or Firm* — Leydig, Voit & Mayer, Ltd.

(57) ABSTRACT

A method for establishing a direct communication using an unmanned aerial vehicle (UAV) with a reconfiguration intelligent surface (RIS) includes configuring RIS parameters based on compensating for undesired oscillations of a position and an orientation associated with the UAV. A signal reflection associated with a beam signal is steered to a target area based on the RIS parameters and by the RIS of the UAV. The signal beam is from a transmitter.

16 Claims, 14 Drawing Sheets

(51) Int. Cl.
*H04W 16/28* (2009.01)
*B64U 10/13* (2023.01)
*B64U 101/20* (2023.01)

(56) References Cited

U.S. PATENT DOCUMENTS

2015/0055689 A1* 2/2015 Tarighat Mehrabani ............... H04B 7/0617 375/219
2018/0054252 A1* 2/2018 Gan ............... H04W 72/046

OTHER PUBLICATIONS

Wu, Qingqing et al., "5G-and-Beyond Networks with UAVs : From Communications to Sensing and Intelligence," pp. 1-29, Oct. 19, 2020, arXiv:2010.09317, Arxiv, US.

Alfattani, Safwan et al., "Aerial Platforms with Reconfigurable Smart Surfaces for 5G and Beyond," *IEEE Commun. Mag.* 59(1), Feb. 2021, pp. 96-102, IEEE, US.

Zhang, Qianqian et al. "Reflections in the Sky: Millimeter Wave Communication with UAV-Carried Intelligent Reflectors," *2019 IEEE Glob. Commun. Conf. GLOBECOM 2019—Proc.*, US, Dec. 2019, doi: 10.1109/GLOBECOM38437.2019.9013626, IEEE, US, pp. 1-6.

Shafique, Taniya et al. "Optimization of Wireless Relaying With Flexible UAV-Borne Reflecting Surfaces," arXiv:2006.10969v1, Jun. 19, 2020, arXiv, US, pp. 1-30.

Abdalla, Aly Sabri et al. "UAVs with Reconfigurable Intelligent Surfaces: Applications, Challenges, and Opportunities," arXiv:2012.04775v1, Dec. 8, 2020, arXiv, US, pp. 1-7.

Kisseleff, Steven et al. "Reconfigurable Intelligent Surfaces in Challenging Environments: Underwater, Underground, Industrial and Disaster," arXiv:2011.12110v1, Feb. 23, 2021. arXiv, US, pp. 1-16.

Zhang, Long et al. "A Survey on 5G Millimeter Wave Communications for UAV-Assisted Wireless Networks," Jul. 16, 2019, Digital Object Identifier 10.1109/ACCESS.2019.2929241, IEEE, US, pp. 117460-117504.

Li, Sixian et al. "Reconfigurable Intelligent Surface Assisted UAV Communication: Joint Trajectory Design and Passive Beamforming," arXiv:1908.04082v1, Aug. 12, 2019, arXiv, US, pp. 1-5.

* cited by examiner

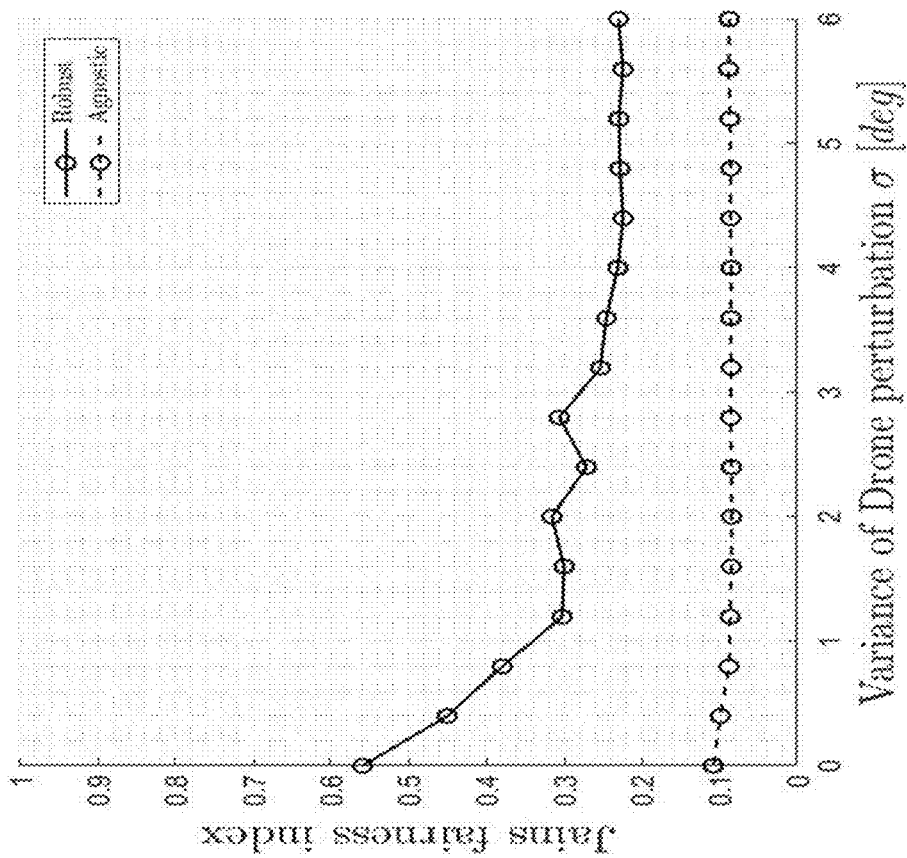
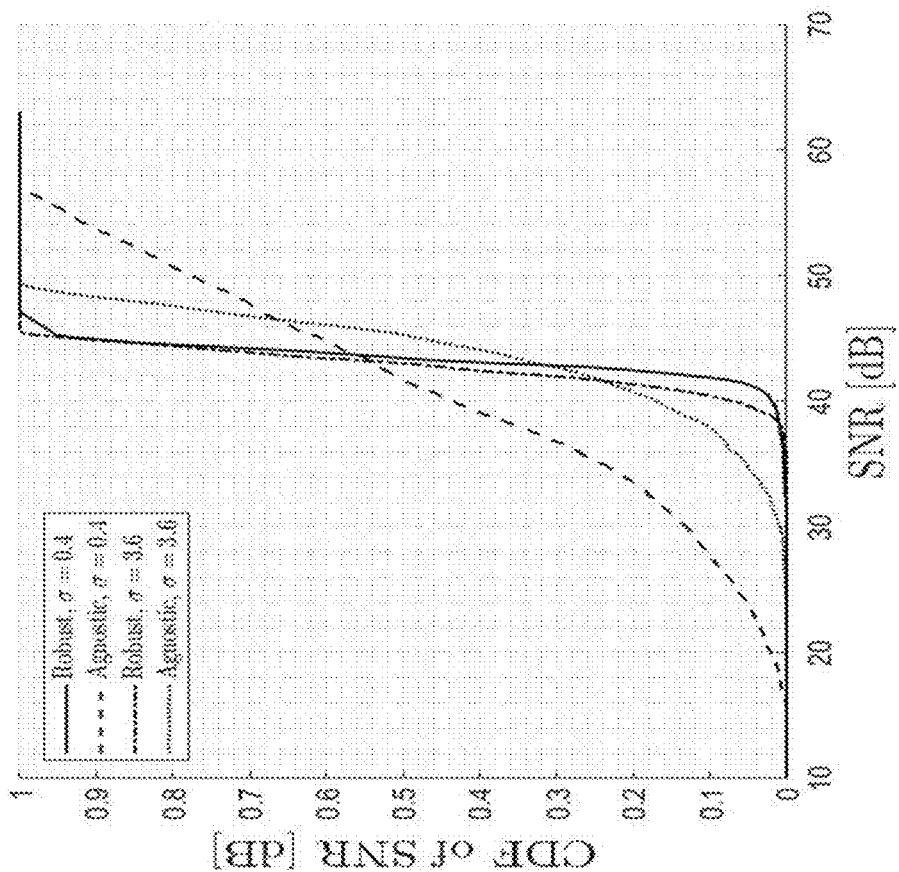
FIG. 4

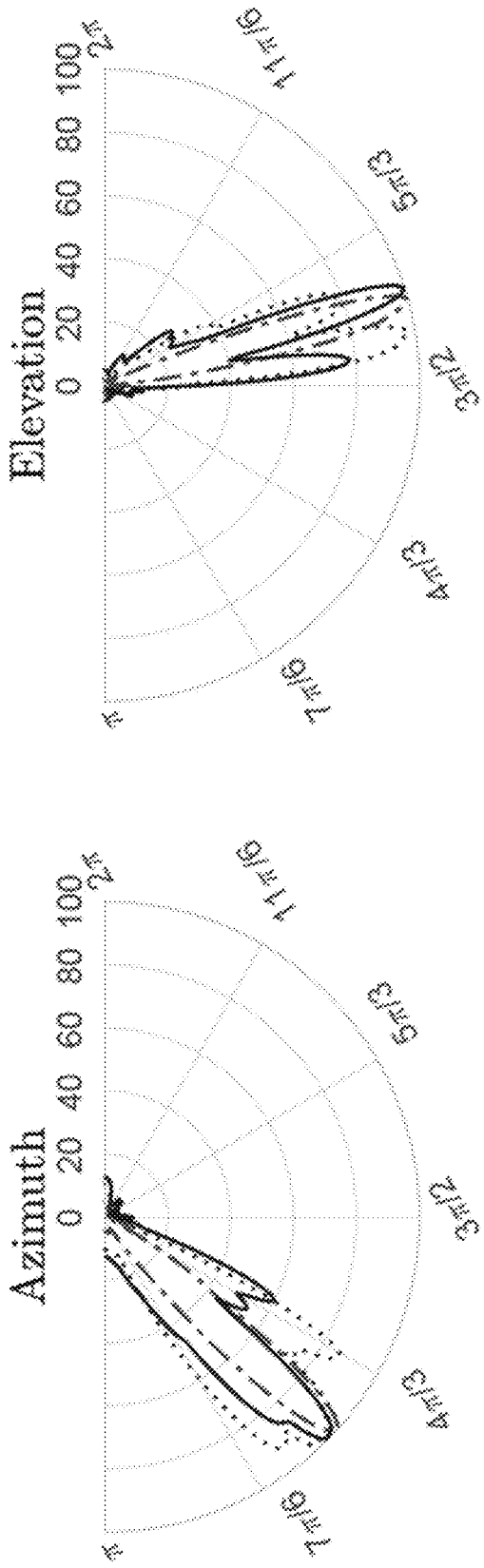
FIG. 7 (a) UAV orientation perturbation σ = 2°
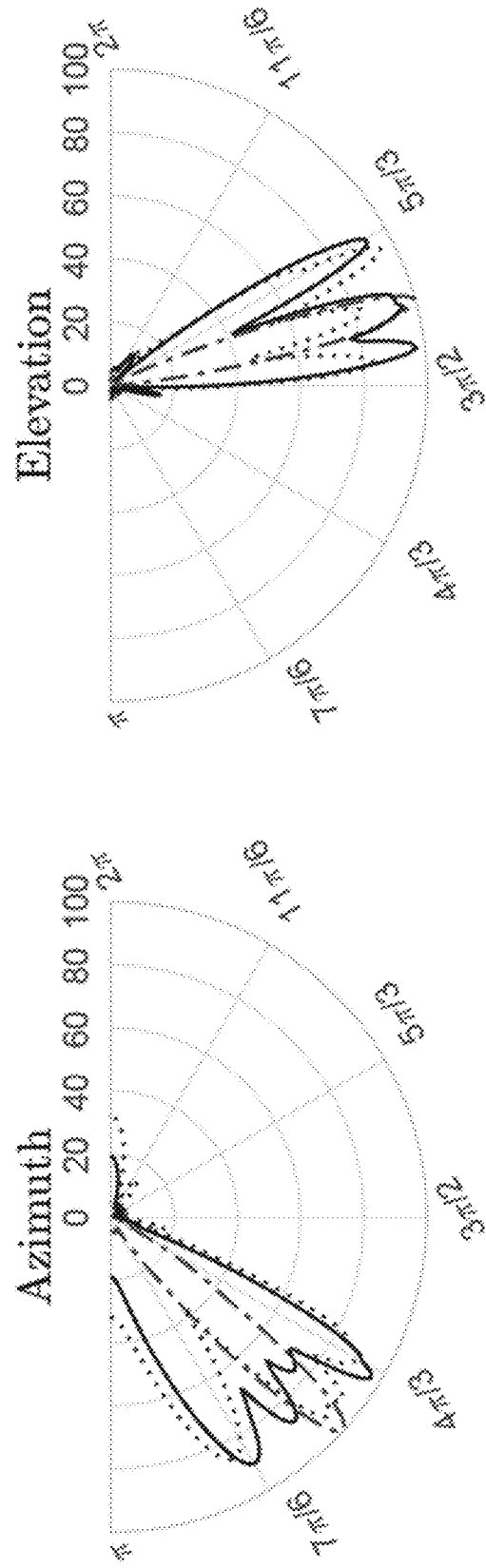
FIG. 7 (b) UAV orientation perturbation σ = 5°

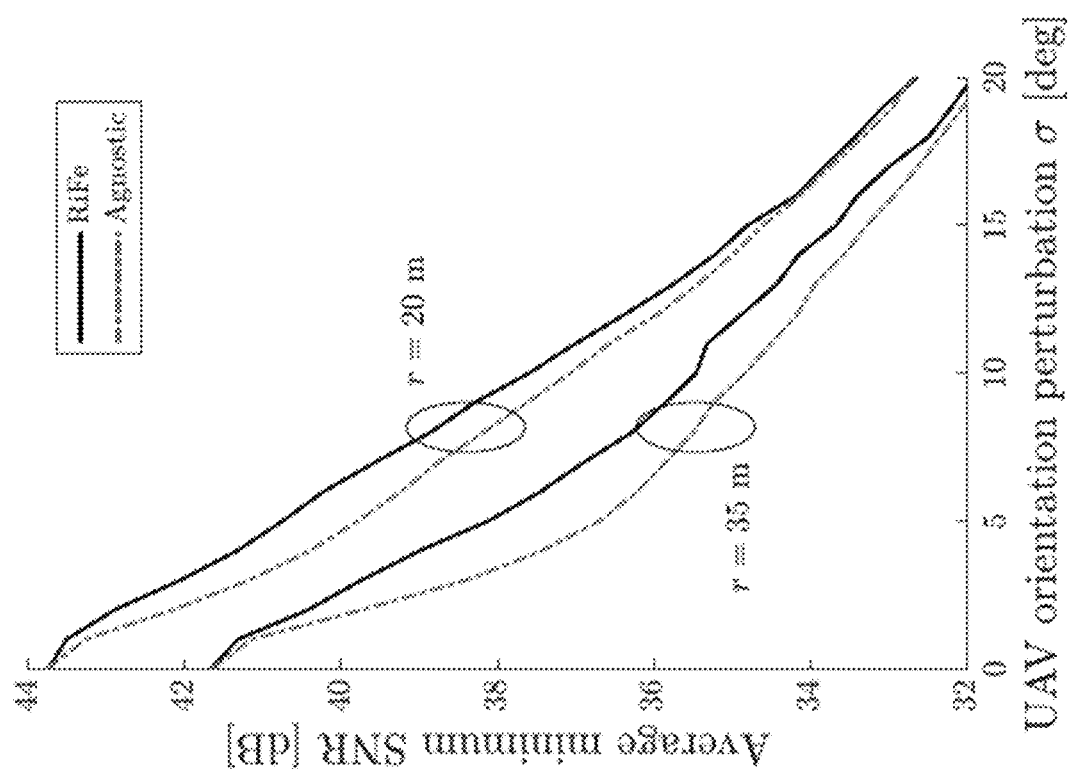
FIG. 8(b) Drone altitude $h_d$ = 70 m.
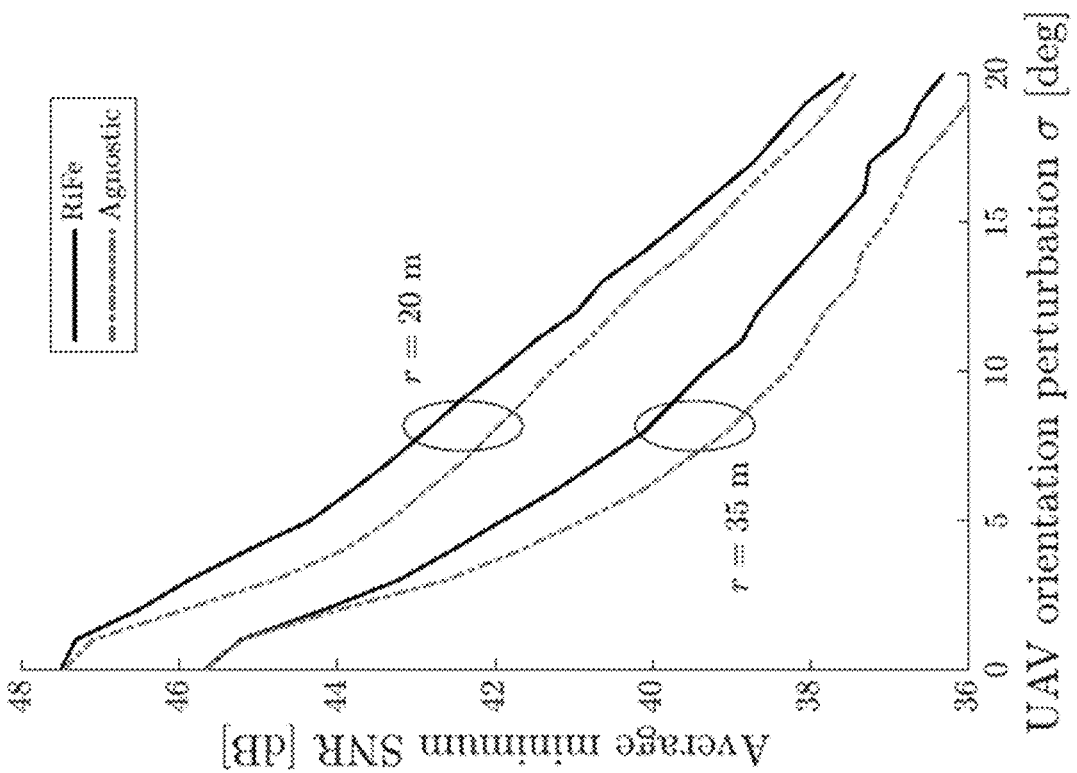
FIG. 8(a) Drone altitude $h_d$ = 50 m.

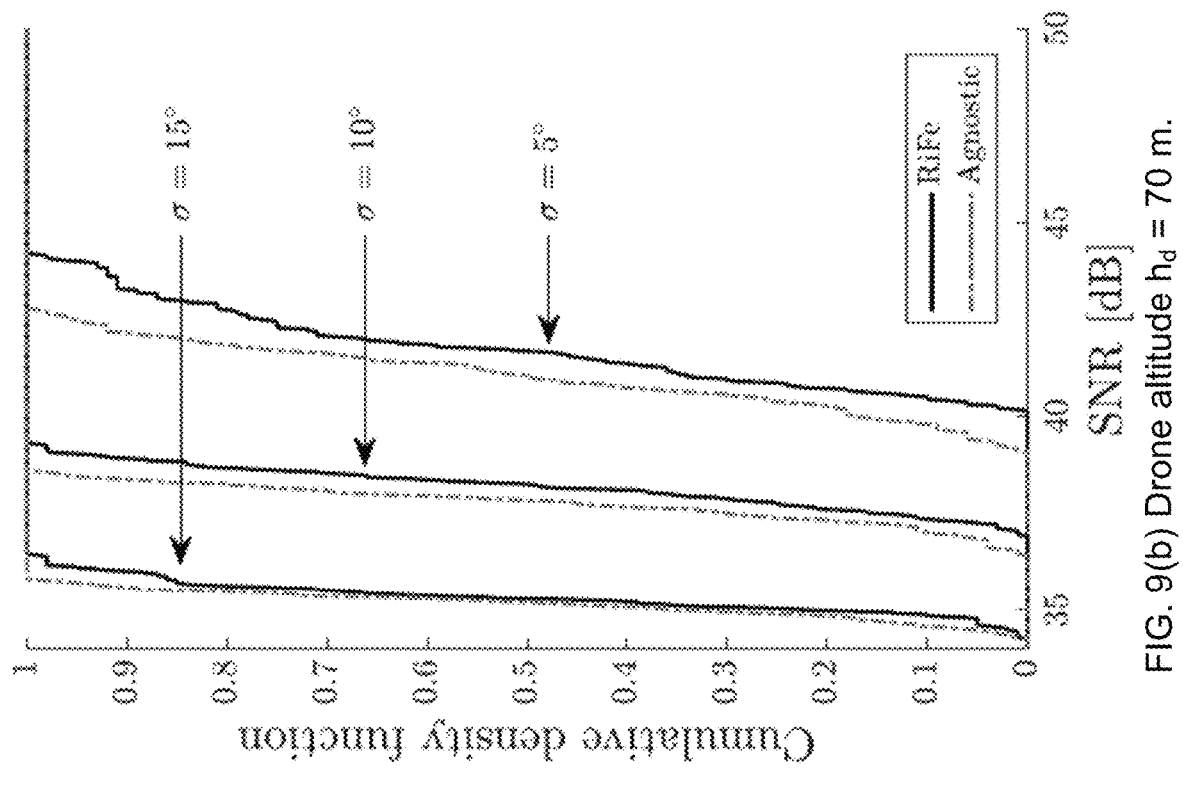
FIG. 9(b) Drone altitude $h_d$ = 70 m.
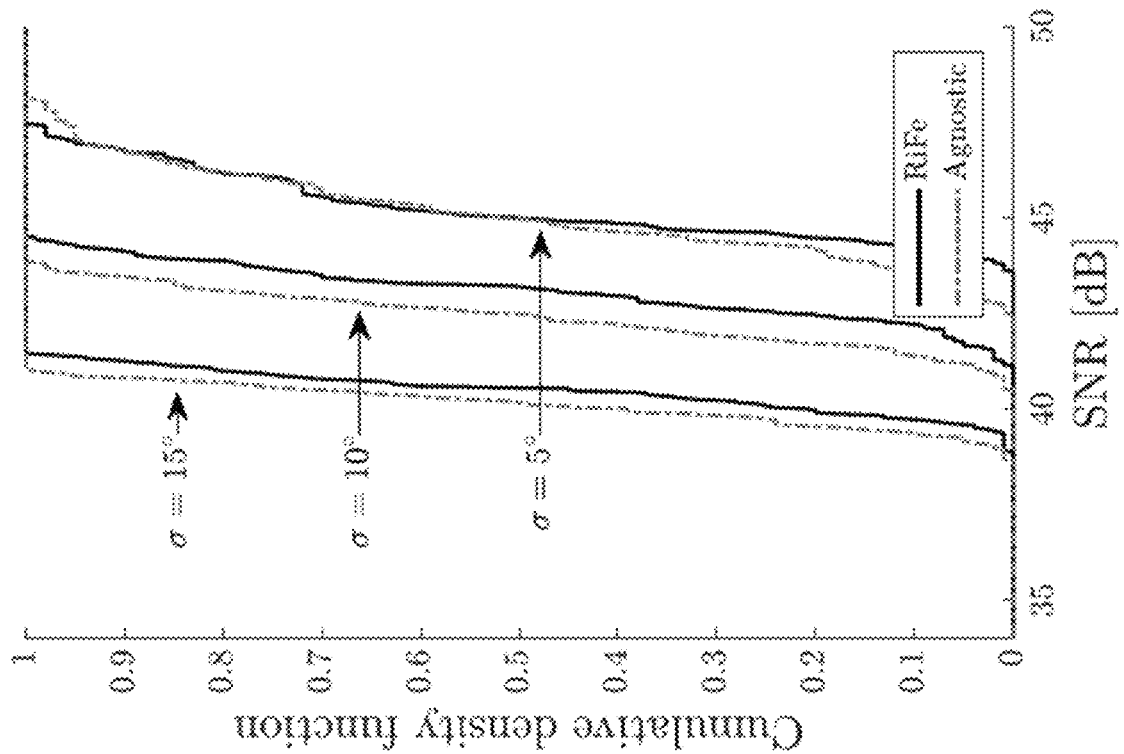
FIG. 9(a) Drone altitude $h_d$ = 50 m.

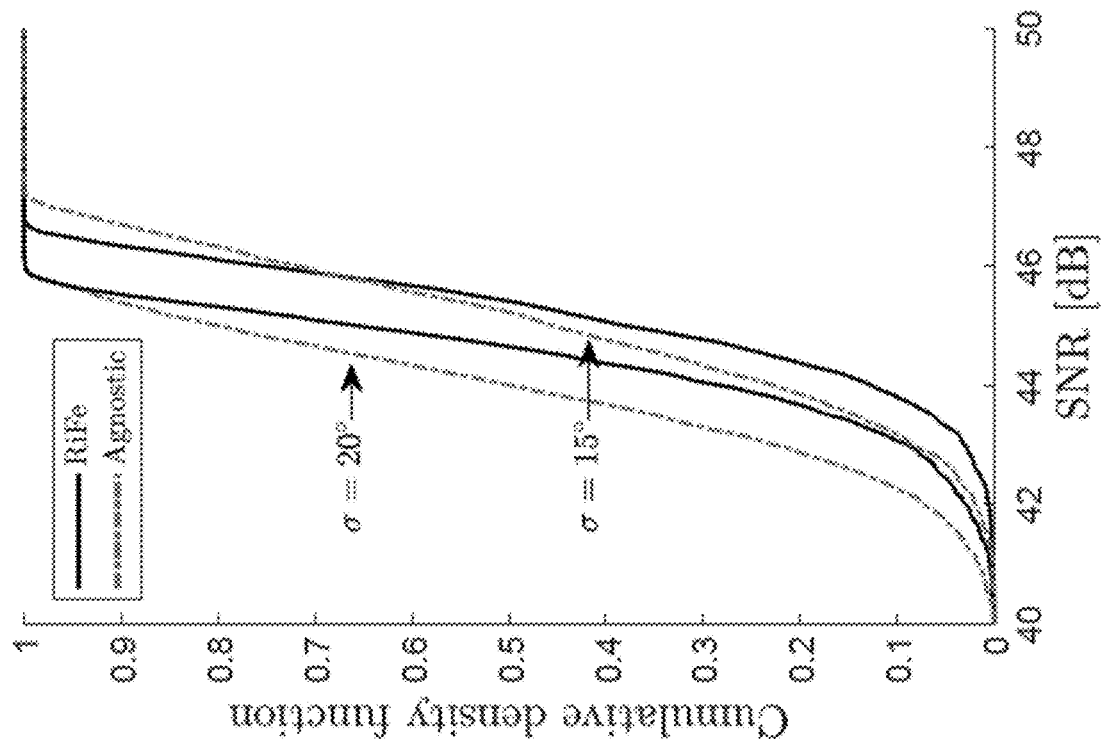
FIG. 12 (b) $\sigma_w = 10$ m.
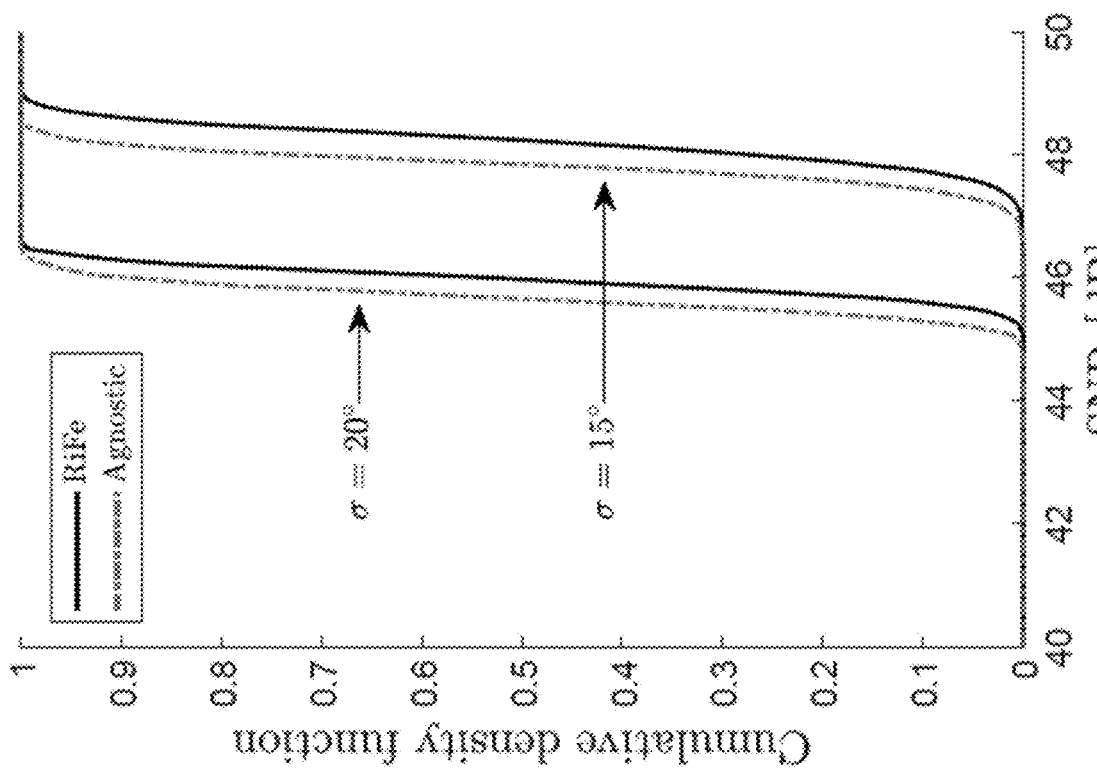
FIG. 12 (a) $\sigma_w = 2.5$ m.

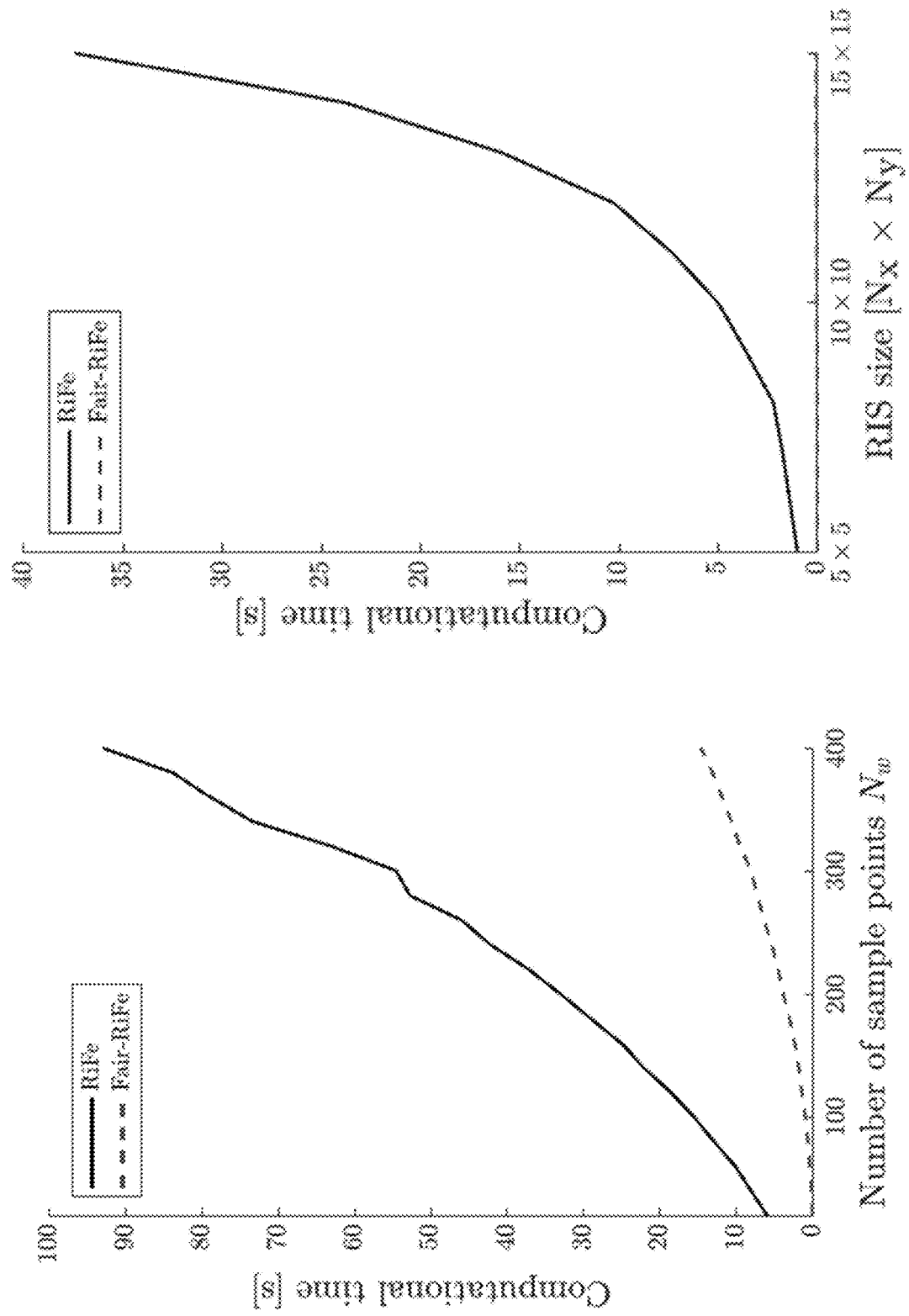
FIG. 14 (a) Solution time against number of sample points $N_w$ with $N = 10$.
FIG. 14 (b) Solution time against RIS configuration with $N_w = 10$.

DYNAMIC CONTROL OF AN UNMANNED AERIAL VEHICLE USING A RECONFIGURABLE INTELLIGENT SURFACE

CROSS-REFERENCE TO PRIOR APPLICATION

Priority is claimed to U.S. Provisional Application No. 63/167,131 filed on Mar. 29, 2021, the entire contents of which is hereby incorporated by reference herein.

FIELD

The present invention relates to a method, system and computer-readable medium for controlling an unmanned aerial vehicle (UAV) using a reconfigurable intelligent surface (RIS).

BACKGROUND

RISs represent a key technology for the next generation of wireless networks capable of providing full control of the propagation environment. In particular, RISs are man-made passive surfaces of electromagnetic material that are electronically controlled with integrated electronics and equipped with unique wireless communication capabilities. One main advantage of an RIS is represented by the ability to turn the inherently stochastic nature of the wireless environment, in a passive manner, into a programmable channel that plays an active role on the way in which wireless signals propagate. This advantage allows to build advanced applications, such as extremely-accurate localization systems or ultra-capacity focused areas, while keeping operational and installation costs low.

SUMMARY

In an embodiment, the present invention provides a method for establishing a direct communication using an unmanned aerial vehicle (UAV) with a reconfiguration intelligent surface (RIS). The method includes the steps of: configuring RIS parameters based on compensating for undesired oscillations of a position and an orientation associated with the UAV; and steering, based on the RIS parameters and by the RIS of the UAV, a signal reflection associated with a signal beam to a target area, wherein the signal beam is from a transmitter.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 4 graphically shows the obtained gain in terms of received signal to noise ratio (SNR) and fairness among the target locations when compensating for the undesired oscillations on the UAV according to an embodiment of the present invention;

FIGS. 7a and 7b graphically show the radiation pattern at the RIS along the azimuth and elevation directions obtained using multiple methods according to embodiments of the present invention;

FIGS. 8a and 8b graphically show the robustness of the RIS to compensate flight effects (RiFe) method and the agnostic method to drone perturbations according to embodiments of the present invention;

FIGS. 9a and 9b graphically show the trade-off between performance improvement and perturbation magnitude for the RiFe and agnostic methods according to embodiments of the present invention;

FIGS. 12a and 12b graphically show the trade-off between performance improvement and perturbation magnitude according to embodiments of the present invention;

FIGS. 14a and 14b graphically show a comparison of computational time of RiFe method and Fair-RiFe method according to embodiments of the present invention.

DETAILED DESCRIPTION

Embodiments of the present invention provide for a passive surface on a UAV to combat undesired UAV oscillations while pursuing the overall communication performance maximization, in particular in emergency situations.

According to an embodiment, the present invention provides a method to dynamically and automatically compensate unexpected UAV movements and orientation changes while properly configuring an RIS to provide connectivity towards selected areas. For example, RIS propagation settings, such as reflection angles or absorption, may be dynamically and opportunistically changed pursuing given key performance indicators (KPIs). In emergency scenarios, when a disaster strikes, it may be necessary to extend network capabilities by means of a UAV that is able to fly over hard-to-reach locations in a relatively short time. The UAV may support first responder teams by providing ultraband connectivity. However, UAVs equipped with a portable base station (BS) or active antennas suffer from limited battery life (see Alfattani, S., et al., "Link budget analysis for reconfigurable smart surfaces in aerial platforms," arXiv: 2008.12334, pp. 2-7 (Aug. 27, 2020), and Wu, Q., et al., "5G-and-Beyond Networks with UAVs: From Communications to Sensing and Intelligence," arXiv:2010.09317, pp. 1-29 (Oct. 19, 2020), each of which is hereby incorporated by reference herein).

In embodiments of the present invention, RISs are boarded on UAVs as passive and lightweight equipment that may extend signal propagation and coverage in a controlled manner. In contrast to other approaches using an RIS, embodiments of the present invention provide an efficient control solution that compensates unwanted oscillations of the UAV (in terms of orientation, tilt angle and position) while still steering the reflected signal towards specific areas (e.g., to provide ultra-band connectivity to first responder teams).

According to embodiments of the present invention, RISs are used to minimize the impact of the battery consumption on an emergency UAV provided with portable network equipment. Additionally, embodiments of the present invention provide a robust solution that take into account unexpected UAV position and orientation changes while optimally configuring the RISs to cover selected areas.

Figure 1:
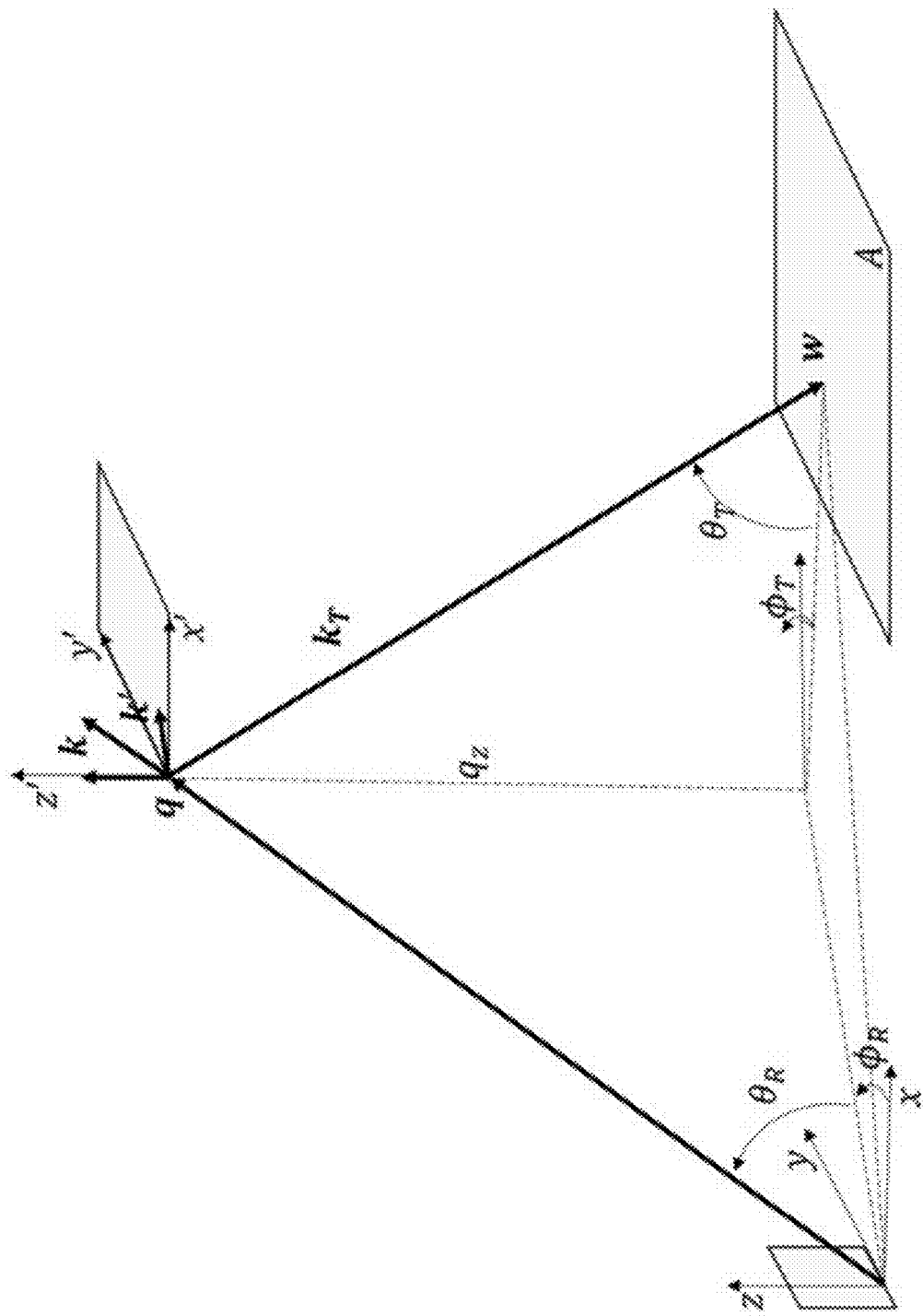
FIG. 1 schematically illustrates a system layout with a transmitter, an RIS, and a receiving area applicable to embodiments of the present invention.

Embodiments of the present invention can be especially advantageously applied to a system layout as shown in FIG. 1, where, for example, the receiver might not be directly reachable from a transmitter, e.g., due to rubble in an emergency scenario or obstacles between the transmitter and receiver. In this context, a UAV may fly and hover over a specific area to provide connectivity to users on the ground in the area by means of portable (3G, LTE, or 5G) base stations. To address the technical problem that this approach may quickly drain the UAV battery power depending on the emitting power set on the UAV base station, embodiments of the present invention utilize lightweight and passive elements, such as RISs, that are installed on the UAV and used to control the reflection of the propagated signal so as to reach specific ground users (or larger ground areas).

In embodiments of the present invention, a transmitter on the ground steers the signal beams towards the RIS flying with the UAV at a given height. The RIS will be configured to control the reflection angle of the incoming signal in order to steer it towards specific ground users (if the user location is known) or larger areas (if only user spatial statistics is known). Based on the RIS position being known, the corresponding configuration may be readily derived based on geometrical considerations. However, based on the RIS position being affected by uncertainty (e.g., due to weather conditions and/or other environmental factors), the corresponding RIS configuration may result in service degradation if not properly tackled.

In an embodiment, the present invention provides a method for establishing a direct communication using an unmanned aerial vehicle (UAV) with a reconfiguration intelligent surface (RIS). The method includes the steps of: configuring RIS parameters based on compensating for undesired oscillations of a position and an orientation associated with the UAV; and steering, based on the RIS parameters and by the RIS of the UAV, a signal reflection associated with a signal beam to a target area, wherein the signal beam is from a transmitter.

In an embodiment, the method further comprises: configuring, by the transmitter, beamforming to steer the signal beam towards the UAV, wherein the transmitter is a base station.

In an embodiment, the RIS parameters are input voltages to one or more RIS elements that determine one or more phase shifts induced by the signal beam.

In an embodiment, configuring the RIS parameters comprises determining the RIS parameters using an optimization algorithm that compensates for the undesired oscillations based on second-order statistics of perturbations associated with the UAV.

In an embodiment, the optimization algorithm is based on mathematical optimization tools and/or artificial intelligence algorithms.

In an embodiment, the method further comprises: maintaining the direct communication between the target area and the transmitter using the RIS of the UAV based on: continuously configuring new RIS parameters to compensate for the undesired oscillations of the UAV; and continuously steering the signal reflection associated with the signal beam using the new RIS parameters.

In an embodiment, the method further comprises: obtaining sensor measurements from one or more sensors of the UAV, wherein the sensor measurements indicate one or more coordinates and an orientation of the UAV; and steering, based on the RIS parameters and by the RIS of the UAV, a signal reflection associated with a signal beam to a target area, wherein the signal beam is from a transmitter.

In an embodiment, determining the UAV statistics associated with the one or more coordinates and the orientation of the UAV is based on building a rescaled histogram of the sensor measurements.

In an embodiment, the method further comprises: obtaining, from the transmitter, an area to be served; and performing area sampling based on the area to be served, wherein configuring the RIS parameters is based on performing the area sampling.

In an embodiment, performing the area sampling comprises: based on information not being available for user positions within the area to be served, generating sample points belonging to the area as uniformly spaced points; and based on a probability density function (pdf) being available for the user positions within the area to be served, generating the sample points belonging to the area according to the pdf.

In an embodiment, the transmitter is a base station, and wherein the method further comprises: obtaining, from the base station, coordinates of the base station, wherein configuring the RIS parameters are based on the coordinates of the base station.

In an embodiment, configuring the RIS parameters is based on using a closed-form equation.

In an embodiment, configuring the RIS parameters is based on using semidefinite programming (SDP).

In another embodiment, the present invention provides a system for establishing a direct communication using an unmanned aerial vehicle (UAV) with a reconfiguration intelligent surface (RIS). The system comprises: a transmitter configured to transmit a signal beam to the UAV; and the UAV with the RIS, wherein the UAV is configured to: configure RIS parameters based on compensating for undesired oscillations of a position and an orientation associated with the UAV; and steer, based on the RIS parameters and by the RIS of the UAV, a signal reflection associated with the signal beam to a target area.

In a further embodiment, a tangible, non-transitory computer-readable medium having instructions thereon which, upon being executed by one or more processors, alone or in combination, provide for execution of a method according to any embodiment of the present invention.

FIG. 1 schematically illustrates a system layout with a transmitter, an RIS, and a receiving area applicable to embodiments of the present invention. For instance, FIG. 1 shows a coordinate plane spanning an x-axis (x), a y-axis (y), and a z-axis (z). The center of the RIS is located at position $q=[q_x,q_y,q_z]$ that is affected by uncertainty. The target position w is shown as well. Further, the variables x', y', z' represent a relative reference system with origin in the bottom right corner of the RIS, with the (x', y')-plane lying on the surface of the RIS. The variable k indicates the direction of propagation of the incoming plane wave at the RIS, which departed from the base station (BS). Also, k' is the projection of k onto the (x', y')-plane lying on the surface of the RIS. Embodiments of the present invention aim to optimally configure the RIS parameters such that the signal coming from the transmitter with azimuth $\varphi_R$ and elevation angle $\theta_R$ will reach the target area (A) taking into account unexpected oscillations which affect the RIS position and orientation. As shown, $\varphi_T$ and $\theta_T$ are the transposes of the azimuth (R and the elevation angle $\theta_R$ respectively. FIG. 1 and the control of the RIS by a UAV will be described in more detail below.

In the approach of Wu, Q., et al. and in the approach of Zhang, Q., et al., "Reflections in the Sky: Millimeter wave communication with UAV-carried intelligent reflectors," 2019 IEEE Global Communications Conference (GLOBECOM), pp. 1-6 (December 2019), which is hereby incorporated by reference herein, some network utility is maximized by intentionally changing the position of the UAV with no concern for undesired oscillations due to perturbations and without providing a solution to address this technical problem. In particular, Wu, Q., et al. merely mention the need to develop optimization algorithms that are robust to unwanted misalignments due to UAV perturbations, and do not propose any solution. Zhang, Q., et al. describe that the position of the UAV is intentionally optimized to guarantee a line-of-sight link with the user and assume that this position is perfectly controllable by the network. However, in real-life scenarios, the (nominal) UAV position is affected by uncertainty because of possible perturbations in the environment that can negatively affect the communication performance if not taken into account. This technical problem is not even recognized in Zhang, Q., et al.

Figure 2:
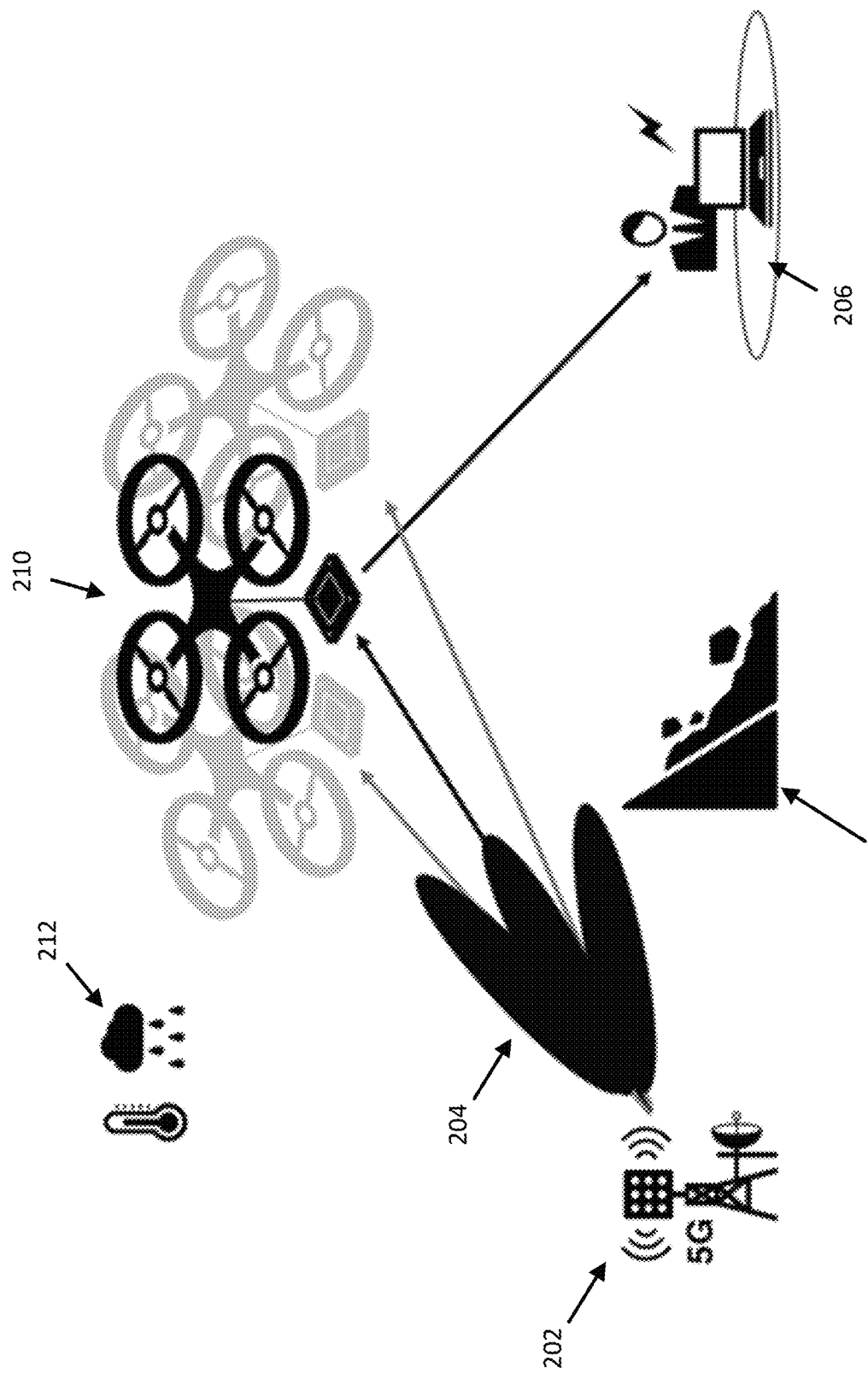
FIG. 2 schematically illustrates a UAV equipped with an RIS that compensates for undesired oscillations in accordance with an embodiment of the present invention.

FIG. 2 schematically illustrates a UAV equipped with an RIS that compensates for undesired oscillations in accordance with an embodiment of the present invention. As shown, the environment 200 includes a first computing device 202 (e.g., a transmitter or a 5G base station) that is transmitting a signal 204 to a second computing device 206 (e.g., a computing device comprising a receiver). However, the first computing device 202 might not be able to directly transmit the signal 204 to the second computing device 206 due to the obstacle 208 (e.g., rubble and/or other obstacles that may prevent direct communication between the transmitter and the receiver). For instance, an emergency scenario may be occurring that requires network connectivity, but the first and second computing devices 202 and 206 might not be able to communicate with each other due to the obstacle 208. Accordingly, a UAV with an RIS 210 may be used to direct the signal 204 to the second computing device 206. Furthermore, while not shown, the second device 206 may also include a transmitter that permits communication back to the first computing device (e.g., the base station). Icons 212 denote that there may be weather conditions such as rain, wind, and/or other environmental factors that may impact the UAV with the RIS 210. As such and as will be described below, the UAV with the RIS 210 may be used to determine optimal position(s) and position itself such that it is capable of providing connectivity between the first and the second computing devices 202 and 206 even through environmental factors.

Referring to FIG. 2, in an embodiment, the present invention provides a static UAV 210 equipped with an RIS. The size of the RIS is preferably selected based on the altitude for the UAV 210. Particularly in emergency scenarios, but also in other scenarios, the UAV 210 may be equipped with an RIS placed on the bottom of the UAV 210 to control signal propagation coming from transmitters placed on the ground while steering the signal towards selected target areas (or ground users) such as the area (A) shown in FIG. 1. The RIS is passive and lightweight. The control of the RIS parameters is performed by means of an independent control channel that may rely on proprietary protocols running on a frequency such as 2.4 gigahertz (GHz) frequency. Advantageously, such a control channel requires very low communication capacity and may be performed with existing communication technologies.

When the UAV 210 is hovering over a specific static location, adverse atmospheric conditions such as wind or rain (denoted by icons 212), may affect its location by introducing unexpected oscillations of UAV location or UAV orientation. While such changes are typically mechanically compensated by UAV 210 rotors based on the UAV 210 sensor feedback, they may result in a wrong instantaneous configuration of the RIS parameters that further impair the overall communication between the transmitter (e.g., the first computing device 202) and the RIS, and between the RIS and the receiver (e.g., the second computing device 206).

Figure 3:
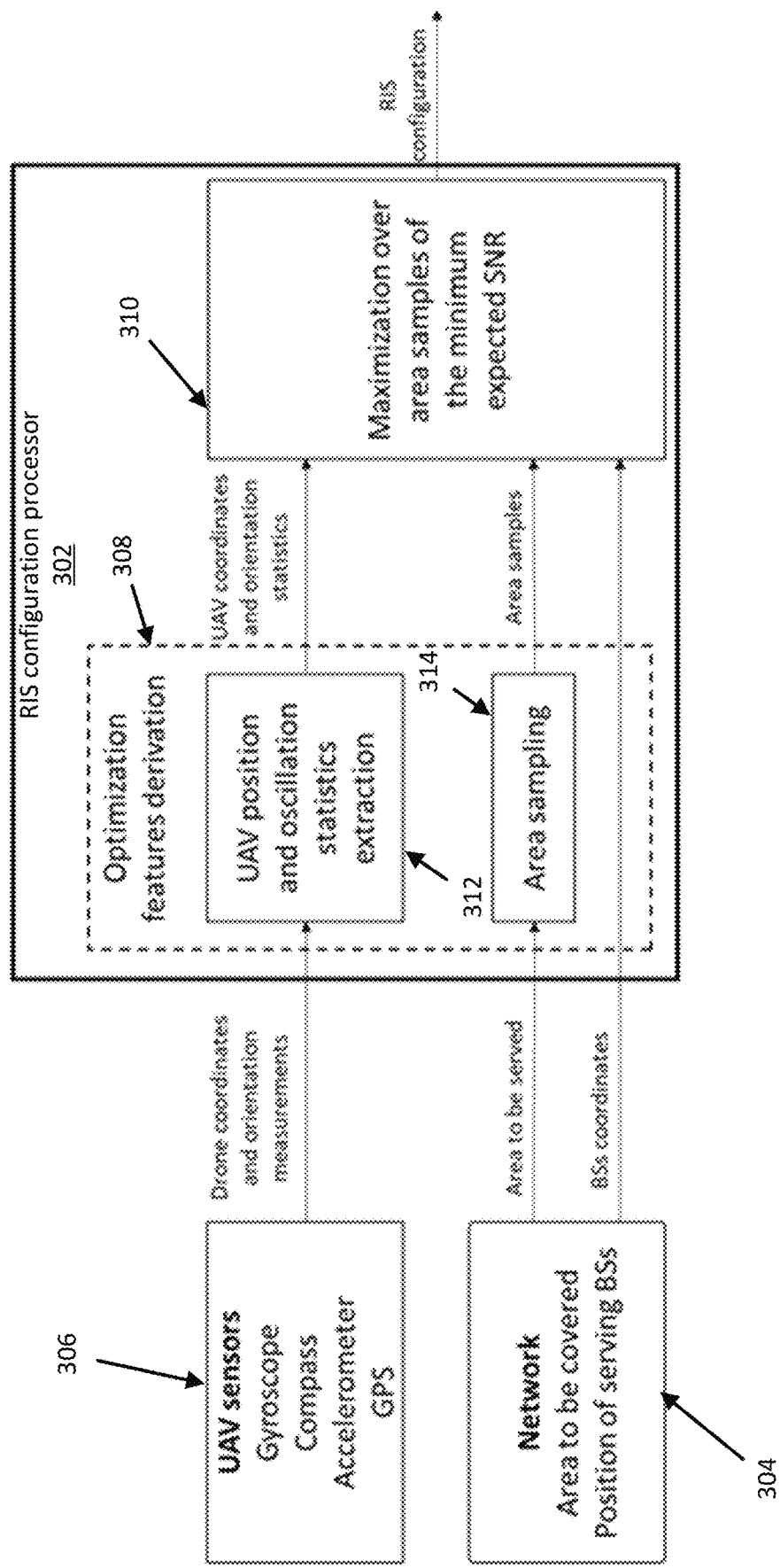
FIG. 3 schematically illustrates a method and system for determining an RIS configuration with an RIS configuration processor according to an embodiment of the present invention.

FIG. 3 schematically illustrates a method and system for determining an RIS configuration with an RIS configuration processor according to an embodiment of the present invention. In particular, FIG. 3 shows, as a block diagram, a method and system according to an embodiment of the present invention for UAV 210 control. A network block 304 and UAV sensors 306 are shown providing information to the RIS configuration processor 302. The RIS configuration processor 302 may be any type of hardware and/or software logic, such as a central processing unit (CPU), module, controller, and/or logic, that executes computer executable instructions for performing the functions, processes, and/or methods described herein. The RIS configuration processor 302 includes an optimization features derivation block 308 and a maximization over area samples of the minimum expected signal-to-noise ratio (SNR) 310. The optimization features derivation block 308 includes a UAV position and oscillation statistics extraction block 312 and an area sampling block 314.

In other words, block 308 uses the data received from the UAV sensors block 306 (e.g., output traces of the global position sensor (GPS), Compass, Gyroscope, and Accelerometer) and from the Network block 304 (e.g., Area to be covered and position of serving BSs) to derive (e.g., determine) the necessary RIS optimization parameters (optimization features) in the input of the RIS configuration optimization processor 302.

Block 312 uses the output traces of the GPS, Compass, Gyroscope, and Accelerometer equipping the UAV to derive the statistical representation of the RIS position and orientation in the space (e.g., first and second-order moments).

Block 314 samples the area of interest. Different techniques may be used depending on the available information on the area to be covered, for example, uniform sampling or Gaussian sampling based on the distribution of the first responders in the area being known.

Block 310 optimizes the RIS configuration such that the minimum SNR over the area samples may be maximized. The optimization takes into account the geometry of the problem (BS, UAV, and area samples position) and the statistics of UAV position and orientation.

In operation, on the network side (e.g., the network block 304), the area to be served is defined and the position of at least one serving base station (BS) (e.g., the first computing device 202 such as the receiver) is provided. Serving BSs are selected to provide connectivity to the area through reflection on the RIS mounted on the UAV 210, for example a drone. In other words, the UAV 210 may receive information from the network (e.g., the first computing device 202, which is a BS) indicating an area to the served (e.g., (A) from FIG. 2) and a position of one or more BSs (e.g., the coordinates/position of the first computing device 202). RIS configuration processor 302 may receive this information and/or additional information from the network block 304.

The area to be covered is approximated by sampling with a set of points. For this, different sampling methods may be used. For example, the area may be sampled following a regular sampling lattice, or if the probability density function of the position of the users to be served in the area is known, techniques such as Monte Carlo sampling may be used. The area sampling technique enables the RIS configuration processor 304 to take into account the user location uncertainty. In other words, the RIS configuration processor 302 receives an area to be served from the network block 304. Then, using the area to be served, the RIS configuration processor 302 uses the area sampling block 314 to determine area samples and the area samples are provided to the maximization over area samples of the minimum expected SNR block 310.

To put it another way, the area sampling block 314 may take as input the coordinates of the target area in terms of x, y, and z coordinate limits (e.g., $x\_1 < x < x\_2$ and so on for y and z) to be served and outputs T sample points (e.g., T triplets (x,y,z) of points that belong to the area). The sample points may be generated in several different ways. For example, based on no information being available on the statistics of the user positions, then the points may be generated as uniformly spaced within the area (e.g., following a regular lattice). Based on the probability density function (pdf) of the user position being known, then the coordinates of the T points are generated with likelihood defined by the distribution's pdf. In operation, this may be done by drawing a uniform number between 0 and 1 and feeding it to the inverse cumulative distribution function, which may be obtained from the pdf.

Further, for flight control and stabilization, the UAVs 210 are natively equipped with sensors 306 (e.g., gyroscope, compass, accelerometer, GPS sensor, and so on). For example, the sensors 306 may determine the drone (UVA 310) coordinates and orientation measurements and provide them to the optimization features derivation block 308. Embodiments of the present invention take advantage of the information (e.g., the coordinates and orientation measurements) from those sensors 306 to determine (e.g., estimate) the distribution of the RIS position and oscillations, and to obtain a statistical representation of the positioning and orientation uncertainties of the reflective surface equipping the drone. This statistical representation enables embodiments of the present invention to take into account the effect of the unwanted movements of the surface (e.g., movements caused by unpredictable meteorological phenomenon such as wind, rain, and so on). In other words, the RIS configuration processor 302 obtains the sensor measurements (e.g., the coordinates and/or orientation measurements) from the UAV sensors 306. Based on the sensor measurements and using block 312, the RIS configuration processor 302 determines statistical representations such as UAV coordinates and orientation statistics and providers them to block 310.

To put it another way, the UAV sensors in block 306 output measurements over time of the drone coordinates and orientation. Once a sufficiently large number of measurements are available, block 312 may extract the statistics of the coordinates and orientation. This may be done in several ways such as by building a rescaled histogram of the measurements. Once such statistics are estimated, they describe the degree of variation of the UAV position and orientation with respect to its nominal position, which may be assumed to be known. The variations are thus due to unwanted movements caused by perturbations.

The statistical representation of the drone positioning and orientation is provided, together with the position of the serving BS and the samples of the input area to the RIS configuration optimization block (e.g., the maximization over area samples block 310), where the RIS configuration is optimized with the aim of maximizing the expected value of the minimum SNR over the samples of the area to be served. The maximization of the minimum expected value takes into account the statistics of both the position and the orientation perturbations, thus obtaining a configuration of the RIS that is robust to the perturbations of the position and orientation of the metasurface. The block 310 may optimize the RIS configuration using mathematical optimization tools and/or with suitably designed artificial intelligence techniques. The position of the BS may be used to derive the proper RIS configuration. The RIS behaves somehow as a tuneable mirror, thus to properly configure it to reflect the signal coming from the BS toward the desired direction, it may be necessary to know the angle of arrival of the incoming signal, which may be derived based on knowing the position of the BS. In some instances, the RIS configuration processor 302 may use the statistical representation of the UAV coordinates and orientation, the area samples, and/or the BSs coordinates to optimize the RIS configuration. For instance, the phase shift and the reflection coefficient of each RIS element may be optimized. These parameters allow to control the reflection of the signal. Thus, the RIS configuration is the set of phase shifts and reflection coefficients applied to the RIS elements. Block 310 will be described in further detail below (e.g., Algorithms 1 and 2 described below).

In some instances, the RIS configuration processor 302 may be implemented by the transmitter (e.g., the transmitter 202). In other instances, the RIS configuration processor 302 may be implemented by the UAV 210.

Embodiments of the present invention, by being able to take undesired oscillations under control and provide an optimal RIS configuration, improve the overall communication performance. FIG. 4 graphically shows the obtained gain in terms of received signal to noise ratio (SNR) and fairness among the target locations when compensating for the undesired oscillations on the UAV according to an embodiment of the present invention. In particular, the obtained gain is empirically demonstrated in FIG. 4, where embodiments of the present invention (denoted as robust) are compared against an agnostic solution where the oscillations are not taken into account (denoted as agnostic). For the evaluation, the height of the UAV was fixed to 20 m and a circular target area of dimension equal to 1,000 $m^2$ was used. To simplify the presentation, it was assumed that the variance of the perturbations on the position of the surface of the RIS along the x, y, and z axis is the same and denoted as σ. On the left-hand side, the cumulative distribution function (cdf) of the received SNR is shown in dB at the target locations for different values of σ expressed in degrees. It can be seen that embodiments of the present invention result in a considerable increase in the worst received SNR. Indeed, the obtained cdf is shifted towards higher values of the SNR compared to the agnostic solution and exhibits a much steeper slope, which indicates that embodiments of the present invention obtain a higher fairness among the target locations. Therefore, while the agnostic solution might obtain a high SNR in a few locations, it also delivers poor SNR in many others. Such behavior is demonstrated in the right-hand side of FIG. 4 which shows the Jain's fairness index of the two methods versus the variance of the perturbations on the position of the surface of the RIS σ. One reason that embodiments of the present invention provide for these improved results is that, when the UAV is subject to perturbations, embodiments of the present invention account for an extra shift in the beamforming design that reflects the power irradiated at the BS as much as possible towards the target area. In contrast, the agnostic solution reflects the beam at the RIS towards a fixed direction, irrespective of the perturbations and, as a result, the power irradiated at the BS is often directed outside of the target area and ultimately wasted.

Embodiments of the present invention provide for the following improvements:

1. UAV 210 provided with passive equipment to dynamically and optimally control the reflection angle of an incoming signal towards desired target areas in a proactive manner.
2. Passive surfaces, in particular an RIS, are optimally and continuously configured to tackle undesired UAV oscillations of location and orientation perturbations by taking into account the gathered statistics of both the position and the orientation perturbations.

In an embodiment, the present invention provides a method for establishing a direct communication among a transmitter located on the ground, a flying object (in particular a UAV equipped with a configurable passive surface in the form of an RIS) and a target area, the method comprising:

1. Configuring the beamforming on the transmitter (e.g., the first computing device 202) to steer the signal beam towards the flying UAV (e.g., UAV 210). For instance, the transmitter may be configured to steer the signal towards the center of the RIS. Since the coordinate of the latter is known with some uncertainty, the transmitter may steer the signal in a way that is robust to such uncertainty. This is in contrast with existing approaches that assume the UAV position (and hence as a consequence also the position of the center of the RIS) is perfectly known. Therefore, if not accounted for, the uncertainty in the position of the UAV may result in a misalignment of the signal steered at the transmitter and hence a loss in terms of overall performance.
2. Properly configure the RIS parameters including the input voltages to the RIS elements that determine the phase shifts induced to the incoming signal, by taking into account undesired oscillations of the UAV position and orientation. For instance, RISs are typically constructed as arrays of passive antennas (e.g., pin diodes) that apply controllable phase shifts to the incoming signal. The desired phase shift is obtained by suitably controlling the input voltage (which in general requires a very small amount of power) to each RIS element (e.g., a passive antenna). Hence, the optimization of the RIS configuration implies to suitably select the applied phase shifts, which in turn can be linked to the input voltages required at each RIS element. The RIS parameters may refer to the ensemble of the selected phase shifts and associated input voltages. Unlike existing approaches that assume that the UAV position and orientation may be perfectly controlled by the network, the present invention uses one or more algorithms for configuring the RIS parameters that compensate for the undesired oscillations at the UAV. The present invention may design robust RIS parameters based on second-order statistics of the perturbations. The optimization algorithm may be based on mathematical optimization tools and/or suitably designed artificial intelligence techniques.
3. Steer the signal reflection reflecting from the RIS mounted on the UAV towards a target area and keep this connection stable. In contrast, in existing approaches, when perturbations occur, the connection may be disrupted since the perturbations are not accounted for in the existing solutions whereas they are accounted for in the present invention.

A significant improvement provided by installing the RIS on the UAV 210 is that it may steer the signal towards hard-to-reach locations without the battery consumption burden that an active antenna would need. Compared to conventional terrestrial solutions where an RIS is installed on the façade of buildings, such a solution exploits the availability of a line-of-sight link with high probability. This property has been demonstrated to be beneficial for the average received SNR. Wu, Q., et al. discuss some advantages of RIS-aided UAV communications, but also demonstrate how to maximize some network utility by intentionally changing the position of the UAV with no concern for undesired oscillations due to perturbations. In this case, the overall communication performance can be negatively affected when variations (even small variations) of the orientation of the RIS and/or its position occur (e.g., due to meteorological phenomena). Indeed, while the UAV is equipped with sensors systems that keep the drone stable and its location fixed while hovering, when adverse meteorological conditions strike, the drone movement counteractions that are automatically taken may result in an instantaneously-incorrect RIS configuration. In Alfattani, S., et al., "Aerial platforms with reconfigurable smart surfaces for 5G and beyond," IEEE Communications Magazine, 59(1), pp. 96-102 (February 2021), which is hereby incorporated by reference herein, the configuration of the RIS on the UAV is optimized in order to maximize the capacity of a set of users whose position is known. Again, the UAV carrying the RIS is assumed to be static throughout the whole data transmission time. In a similar way, Zhang, Q., et al. describe a reinforcement approach is used to find the correct (nominal) position of the UAV to maximize the downlink capacity. In such a scenario, when perturbations occur, they result in erroneous configurations of the RIS if not taken into account in the optimization procedure.

Accordingly, existing approaches assume for simplicity that the UAV has a perfectly stable flight when optimizing the RIS configuration. In contrast, embodiments of the present invention are able to optimize in real-life scenarios where the UAV is subject to perturbations (e.g., due to meteorological phenomena) and provide a system that takes into account undesired perturbations while continuously configuring the on-board RIS. This procedure aims at maximizing the overall performance in terms of fairness within a target area and minimum experienced SNR. Moreover, embodiments of the present invention are first to provide for a RIS on a UAV for emergency scenarios. With embodiments of the present invention, the RIS can be optimally deployed on the UAV even when adverse meteorological conditions strike.

In the following, embodiments of the present invention are described in further detail, including the embodiments described above in FIGS. 1-4. In particular, next generation mobile networks need to expand towards uncharted territories in order to enable the digital transformation of society. In this context, aerial devices such as unmanned aerial vehicles (UAVs) are expected to address this gap in hard-to-reach locations. However, limited battery-life is an obstacle for the successful spread of such solutions. Reconfigurable intelligent surfaces (RISs) represent a promising solution addressing this challenge since on-board passive and lightweight controllable devices may efficiently reflect the signal propagation from the ground BSs towards specific target areas.

Embodiments of the present invention focus on air-to-ground networks where UAVs equipped with RIS may fly over selected areas to provide connectivity. In particular, the present invention describes how to optimally compensate flight effects and use the RIS to compensate flight effects (RiFe) as well as its practical implementation Fair-RiFe that automatically configures RIS parameters accounting for undesired UAV oscillations due to adverse atmospheric conditions. The results show that both algorithms/methods provide robustness and reliability while outperforming state-of-the-art solutions in the multiple conditions studied.

Unmanned aerial vehicles (UAVs), which are also referred to as drones herein, are increasingly becoming part of peoples' lives by enhancing the work that they do, e.g., package delivery, how to entertain themselves and how to extend the safety and security of society. Lithium ion (Li-ion) batteries have already reached a mature state thereby allowing limited-size devices to fly towards hard-to-reach locations in very short time. Recently, the telecom industry and academia made a big effort in bringing flexibility and agility to advanced wireless networks that rely on flying access points, namely air-to-ground networks. UAVs have demonstrated to be suitable for readily establishing a line-of-sight (LoS) link towards ground users thereby avoiding obstacles that impair the overall communication quality. Dense-urban scenarios further exacerbate the obstruction issues making UAVs a viable solution for building reliable networks on-demand.

Due to their fast-deployment property, UAVs have been identified as a key technology to deal with emergency situations so as to expedite rescue operations, e.g., assisting first-responder teams, in areas where there might not be connectivity or when the network infrastructure is temporarily damaged or unavailable. For instance, UAVs may be used to bring back-up connectivity in such areas and/or leverage on advanced sensing and localization techniques exploiting the cellular protocol stack to find missing people. However, since they are envisioned as flying mobile base stations (BSs) carrying one or more active antennas, a significant increase of the total power consumption and, in turn, battery drain issues are expected due to i) the weight of active elements, ii) the power irradiated to reach ground targets, and iii) the additional power burden required to establish a backhaul link and process incoming packets.

To overcome the above-mentioned issues, lightweight and low-energy equipment may be needed on board. In this context, reconfigurable intelligent surfaces (RISs) are currently gaining much attention owing to their ability to control the propagation environment by altering reflection, absorption and amplitude properties of the material where the signal bounces off. This introduces a new powerful tool that allows to efficiently redirect the signal propagation at very limited power expense: varactor diodes may apply a phase shift and/or absorb the incoming signal in a real-time reconfigurable way. Passive, flexible and configurable elements match a variety of envisioned applications spanning among electromagnetic field exposure efficiency (EMFEE)-boosted communications, extreme-accurate localization mechanisms and user-centric quality-of-service-enhanced connections.

Figure 5:
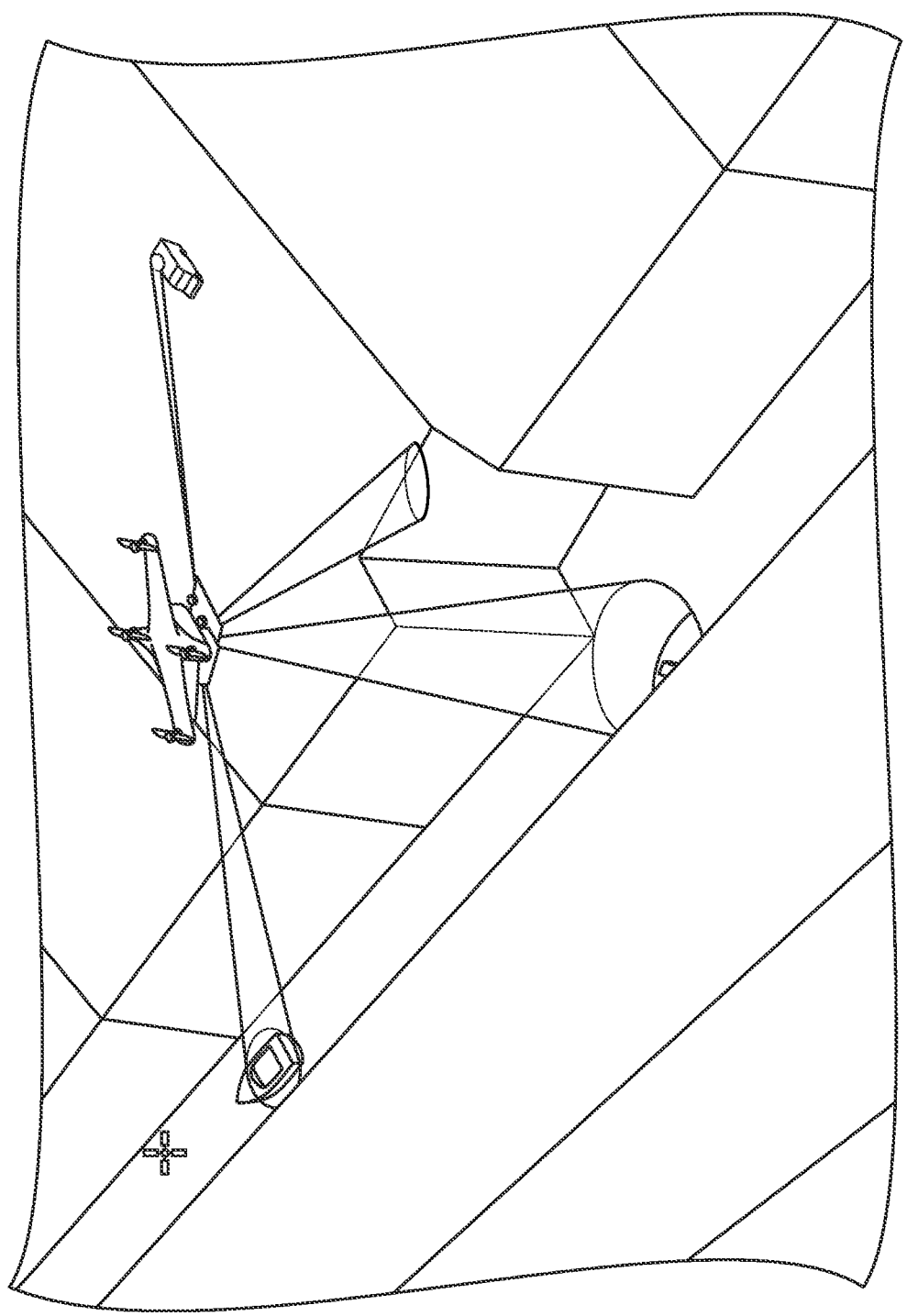
FIG. 5 illustrates an exemplary UAV equipped with a lightweight RIS for covering first-responder teams and victims in an emergency scenario according to an embodiment of the present invention.

FIG. 5 illustrates an exemplary UAV equipped with a lightweight RIS for covering first-responder teams and victims in an emergency scenario according to an embodiment of the present invention. As shown, conventional UAV-based systems may be combined with comfortably sized RISs to effectively reflect incoming signal towards hard-to-reach locations while keeping the power consumption very low. While appropriate RIS modeling assumes the location of transmitters, receivers and RIS to be known, the high mobility property of UAVs introduces unprecedented random variables in such a complex analysis. Additionally, the overall communication performance may be negatively affected when small variations of the orientation of the RIS and/or its position occur. Sophisticated sensors system(s) and/or GPS antennas may be built to keep the drone stable and its location fixed while hovering on selected areas: when adverse meteorological conditions strike, drone movement counteractions are automatically taken but still orientation oscillations or location perturbation may result in an instantaneously-wrong RIS configuration.

The present invention focuses on the above-mentioned scenario where UAVs are provided with passive RISs to support first responder teams in selected target areas. Embodiments of the present invention describe using RiFe to tackle the problem of undesired UAV oscillations while steering signal reflections to build a robust and reliable air-to-ground network solution.

Embodiments of the present invention describe the design of an optimization framework that addresses undesired UAV oscillations—caused by meteorological phenomena—which exacerbates when higher altitudes are considered. This is in marked contrast with prior works that usually assume a perfectly stable flight. Since UAV flight perturbations are always present and inevitable in real-life situations, the present invention (e.g., RiFe and/or Fair-RiFe) aims to maximize the worst SNR averaged over the unwanted perturbations on the UAV in a target area wherein a number of receivers is present. RiFe may be based on second-order statistics of the perturbations and of the position of the receivers. Thus, an advantage of such approach is the reduction in the overhead necessary to acquire instantaneous channel information.

In addition to the optimization framework, RiFe may be extended to account for practical considerations such as the need to update the RIS parameters due to rapidly-changing channel statistics, the mobility of the UAV as well as complexity issues and rename it as Fair-RiFe. The numerical results show, as expected, that the present invention outperforms state-of-the-art solutions that assume perfectly stable flights. Indeed, the present invention results in a considerably higher received SNR at target locations due to more robust passive beamforming at the RIS. Among other improvements, four improvements of the present invention are thus summarized in the following:

C1: A novel mathematical framework to maximize the worst SNR within a given target area by taking into account unwanted rotations on the position of the surface of the RIS due to flight perturbations.

C2: A low-complexity approach RiFe that tackles the solution of the aforementioned problem by designing both the precoding vector at the BS and the adequate RIS configuration.

C3: An easy-to-develop solution Fair-RiFe that accounts for practical considerations such as time and/or complexity constraints on the optimization routine and reconfiguration of the RIS.

C4: Exhaustive numerical results that show substantial gains in terms of received average SNR at the target locations with respect to traditional solutions.

The below describes the system and defines the key physical quantities of interest, a problem formulation to optimize the considered metric and propose RiFe to tackle its solution, a Fair-RiFe, which takes into account practical considerations such as timing constraints and UAV mobility, numerical results to evaluate the performance of the proposed algorithms, methods, and systems, traditional approaches when integrating RISs in UAV-based communications as well as highlighting the differences with respect to the present invention, and a conclusion.

As used below, italic letters are used to denote scalars, whereas vectors and matrices are denoted by bold-face lower-case and upper-case letters, respectively. $\mathbb{C}$ and $\mathbb{R}$ denote the set of complex and real numbers, respectively. $\mathbb{C}^N$ and $\mathbb{C}^{N \times M}$ are used to represent the sets of N-dimensional complex vectors and N×M complex matrices, respectively. $I_N$ stands for the identity matrix of size N while j represents the imaginary index. Vectors are denoted by default as column vectors while subscripts represent an element in a vector. For instance, $x=[x_1, \ldots, x_n]^T$ is a vector from $\mathbb{C}^N$ and $x_i$ is its i-th component. The symbols, $(\cdot)^T$, $\mathbb{E}[\cdot]$, $(\cdot)^*$, $tr(\cdot)$ and $(\cdot)^H$ represent the transpose, expectation, complex conjugate, trace, and Hermitian transpose operator, respectively. $\|\cdot\|$ denotes the L2-norm of a vector. $|\cdot|$ and $\angle \cdot$ denote the absolute value and angle of a complex number, respectively.

Figure 6:
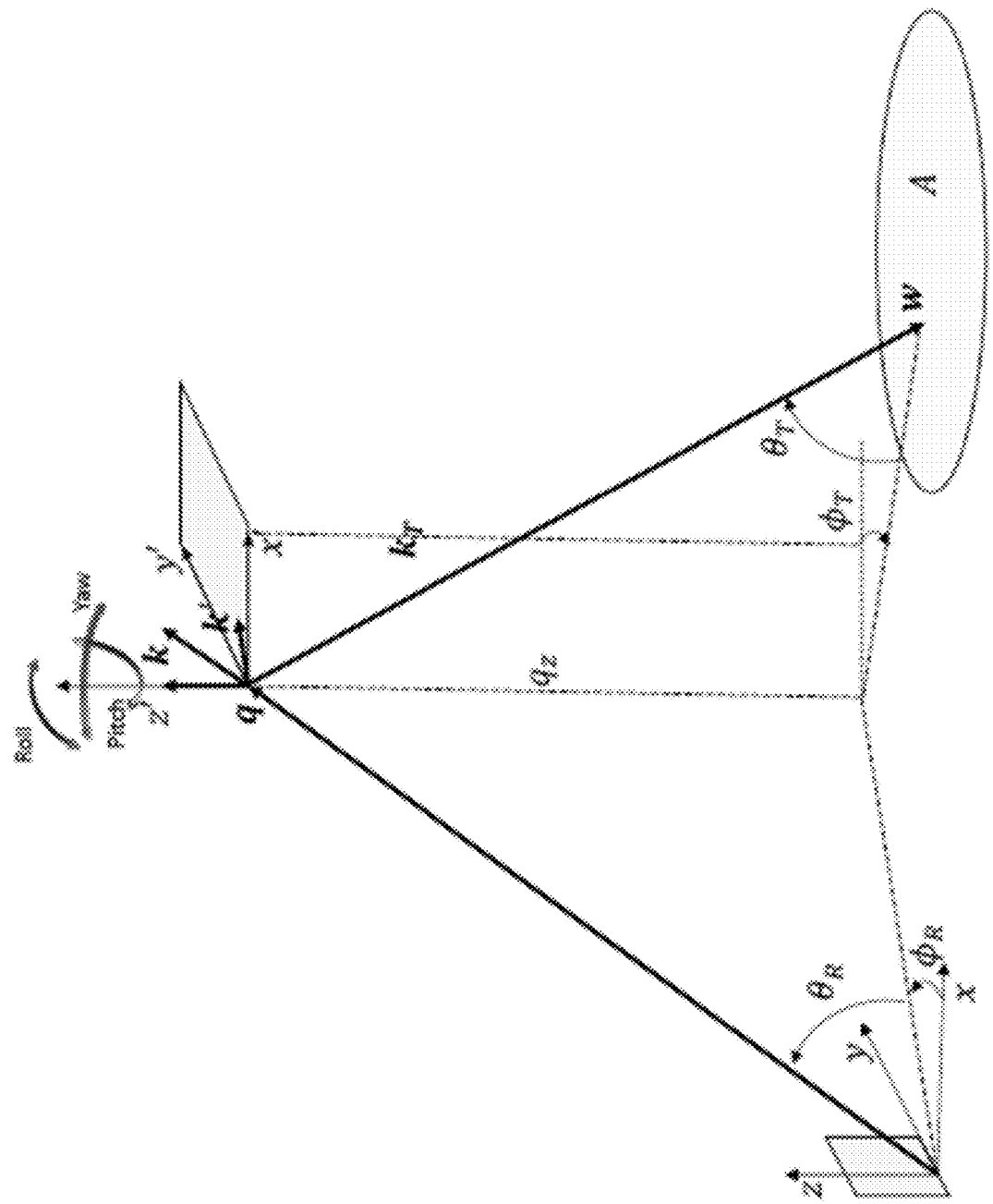
FIG. 6 schematically illustrates another system layout with a transmitter, an RIS, and a receiving area applicable to embodiments of the present invention.

FIG. 6 schematically illustrates another system layout with a transmitter, an RIS, and a receiving area applicable to embodiments of the present invention. FIG. 6 is similar to the system shown in FIG. 1, but includes additional and/or alternative features/elements. For instance, the area (A) shown in FIG. 6 is circular whereas the area (A) shown in FIG. 1 is rectangular. FIG. 6 further includes the coordinates for pitch, roll, and yaw for the UAV. Referring to FIG. 6, a geometrical representation is depicted, which includes the transmitter (bottom left side), the RIS (top part), and the target area A (bottom-right side). A base station (BS), or general transmitter (e.g., the first computing device 202), located at the origin and equipped with M antennas whose signal may cover a target area A wherein first responders, victims, and/or others are present. Moreover, a RIS mounted on a UAV is considered, composed of N reflecting elements and reflecting the signal coming from the BS towards the target area. Specifically, each aforementioned receiver may be reached by a signal experiencing a minimum SNR to successfully decode the upcoming packets. In some instances, the position of the first responder team is known with some uncertainty, whereas only a probability distribution function (pdf) of the spatial position of the victims may be known.

Considering that the UAV is hovering, it might be subject to perturbations due to the wind or other meteorological phenomena, which result in undesired roll, yaw and pitch of the surface of the RIS. Therefore, let $q=[q_x, q_y, q_z]^T$ denote the position of the center of the RIS and $\emptyset_R$ and $\theta_R$ denote the azimuth and elevation angles of the geographical path connecting the BS to the RIS, respectively. Hence, the coordinates of q may be expressed as $q_x=\|q\| \cos(\theta_R) \cos(\emptyset_R)$, $q_y=\|q\| \cos(\theta_R) \sin(\emptyset_R)$, and $q_z=\|q\| \sin(\theta_R)$, respectively. Furthermore, let $r=[\psi_x, \psi_y, \psi_z]^T$, which takes into account the possible perturbations on the orientation of the surface of the RIS, where the random variables (RVs) $\psi_x$, $\psi_y$ and $\psi_z$ represent the rotations on the x, y, and z axes, respectively. The term "r" is a 3 element vector describing the perturbation of the RIS orientation. It represents the undesired rotation on the x axis (Pitch), y axis (Roll), and z axis (Yaw).

In some examples, such rotations may be mutually independent and normally distributed with zero mean and variance $\sigma_{\psi,x}^2$, $\sigma_{\psi,y}^2$, and $\sigma_{\psi,z}^2$, respectively. In some variations, the BS may have knowledge of the statistics of r. Let $w=[w_x, w_y, w_z]^T \in \mathcal{A}$ —distributed according to a given probability density function expressed as per f (w)—be a point in the target area to be covered and let $\emptyset_T$ and $\theta_T$ denote the corresponding azimuth and elevation angles with respect to the RIS, respectively. The coordinates of w can thus be expressed as $w_x=\|w\| \cos(\theta_T) \cos(\emptyset_T)$, $w_x=\|w\| \cos(\theta_T) \sin(\emptyset_T)$, and $w_z=\|w\| \sin(\theta_T)$, respectively. Note that in the case of first responder team, $f_w(w)$ may be modelled as the union of two-dimensional Gaussian distributions whose means correspond to the nominal positions of each first responder member and with given variances along each direction. Conversely, when considering victims, $f_w(w)$ can be modeled again as a two-dimensional Gaussian distribution with mean equal to the center of the target area and with given variances along the two directions in space. If both first responder team and victims are present, then $f_w(w)$ is modeled as the union of the two aforementioned cases.

The distance $d_1$ between the source node and the RIS is defined as the following:

$$d_1(q) \triangleq \|q\|, \quad (1)$$

whereas the distance $d_2$ between the RIS and the target position w is defined as the following:

$$d_2(q,w) \triangleq \|q-w\|, \quad (2)$$

Hence, the overall length d of the communication path is equal to: $d(q, w)=d_1(q)+d_2(q,w)$.

Given the position of the RIS with respect to the BS and the target area A, the communication links between the BS and the RIS, and between the RIS and the target points in A may be determined to be in line-of-sight (LoS) condition with a very high probability. Therefore, the channel power gain $\beta_1$ from the source to the RIS is defined as per:

$$\beta_1(q) \triangleq \frac{\beta_0}{d_1^2(q)} = \frac{\beta_0}{\|q\|^2}, \quad (3)$$

where $\beta_0$ is the channel power gain at a reference distance. In a similar way, the channel power gain between the RIS and the target point co may be defined as the following:

$$\beta_1(q, w) \triangleq \frac{\beta_0}{d_2^2(q, w)} = \frac{\beta_0}{\|q-w\|^2}. \qquad (4)$$

A relative reference system $\Omega$ may be considered with origin in the right bottom corner of the RIS and with the (x, y)-plane lying on the RIS surface as shown in FIG. 6. The position of the i-th element of the RIS with respect to $\Omega$ is defined by the vector $c_i^{(\Omega)} = [x_i, y_i, z_i]^T$. The position of the i-th element of the RIS in the absolute coordinate system, which has the origin located at the BS, is thus expressed as:

$$c_i = R(r)c_i^{(\Omega)} + q, \qquad (5)$$

where the rotation matrix $R(r) \in \mathbb{R}^{3\times 3}$ takes into account the possible aforementioned rotations of the RIS with respect to the absolute reference system and it is defined as the following:

$$R(r) \triangleq R_x(\psi_x)R_y(\psi_y)R_z(\psi_z) \qquad (6)$$

with the rotation matrices on the x, y, and z axes defined as:

$$R_x(\psi_x) \triangleq \begin{pmatrix} 1 & 0 & 0 \\ 0 & \cos\psi_x & -\sin\psi_x \\ 0 & \sin\psi_x & \cos\psi_x \end{pmatrix}, \qquad (7)$$

$$R_y(\psi_y) \triangleq \begin{pmatrix} \cos\psi_y & 0 & \sin\psi_y \\ 0 & 1 & 0 \\ -\sin\psi_y & 0 & \cos\psi_y \end{pmatrix}, \qquad (8)$$

and $$R_z(\psi_z) \triangleq \begin{pmatrix} \cos\psi_z & -\sin\psi_z & 0 \\ \sin\psi_z & \cos\psi_z & 0 \\ 0 & 0 & 1 \end{pmatrix}, \qquad (9)$$

respectively.

In some variations, the drone may be flying at an altitude such that the incoming signal may be considered as a plane wave with propagation direction identified by $$= \frac{q}{\|q\|}.$$

For instance, the far-field beamforming case from the UAV equipped with a RIS and the ground may be considered. Hence, the phase shift on the i-th element of the RIS related to the incoming signal from the BS is defined as the following:

$$\phi_i^R(q, r) \triangleq \frac{2\pi}{\lambda} k^T R(r) \begin{bmatrix} I_2 & 0 \\ 0^T & 0 \end{bmatrix} c_i^{(\Omega)} \qquad (10)$$

$$= \frac{2\pi}{\lambda}\cos\theta_R \begin{bmatrix} \cos(\phi_R - \psi_z) & \cos\psi_y \\ \sin(\phi_R - \psi_z) & \cos\psi_x \end{bmatrix}^T \begin{bmatrix} x_i \\ y_i \end{bmatrix} + \frac{2\pi}{\lambda}\sin\theta_R \begin{bmatrix} \sin\psi_y \\ \sin\psi_x \end{bmatrix}^T \begin{bmatrix} x_i \\ y_i \end{bmatrix} \qquad (11)$$

$$= v_R(q, r)^T \bar{c}_i^{(\Omega)}, \qquad (12)$$

where $\lambda$ represents the signal wavelength and where $\bar{c}_i^{(\Omega)}$ is defined as equal to the first two elements of $c_i^{(\Omega)}$ and the vector $v_R(q,r)$ that describes the spatial frequency on the surface of the RIS corresponding to the incoming signal from the BS. In some instances, regarding the above equations and since the present invention is interested in the phase shift on the surface of the RIS, the coordinate along the z-axis may be safely ignored so as to reduce notation clutter. The phase shifts on the elements of the RIS depend on the undesired changes of the orientation of the UAV r. The elements of the receiving array response vector $a_R(q, r) \in \mathbb{C}^{N\times 1}$ at the RIS are thus expressed as $$[a_R(q, r)]_i = e^{-j\phi_i^R(q,r)}, i = 1 \ldots N. \qquad (13)$$

Similarly, the phase shift on the i-th element of the RIS and the corresponding value of the antenna array response when reflecting the signal towards the target point w are defined as the following $$\phi_i^T(q, w, r) \triangleq \frac{2\pi}{\lambda}\cos\theta_T \begin{bmatrix} \cos(\phi_T - \psi_z) & \cos\psi_y \\ \sin(\phi_T - \psi_z) & \cos\psi_x \end{bmatrix}^T \bar{c}_i^{(\Omega)} + \qquad (14)$$

$$\frac{2\pi}{\lambda}\sin\theta_T \begin{bmatrix} \sin\psi_y \\ \sin\psi_x \end{bmatrix}^T \bar{c}_i^{(\Omega)}$$

$$= v_T(q, w, r)^T \bar{c}_i^{(\Omega)} \qquad (15)$$

and $$[a_T(q, w, r)]_i = e^{-j\phi_i^T(q,w,r)}, i = 1 \ldots N, \qquad (16)$$

respectively, where the vector $v_T(q, r)$ is defined such that it describes the spatial frequency on the surface of the RIS when reflecting the signal towards the target area.

The random phase shifts $\phi_i^R$ and $\phi_i^T$ refer respectively to the incoming and departing wave with respect to the RIS surface. These phase shifts may need to be properly aligned by suitably adjusting the RIS parameters: the role of the RIS is to maximize the network performance while statistically counteracting the undesired rotations of the RIS surface r caused by perturbations.

The channel between the RS and the RIS may be defined as the following:

$$G(q,r) \triangleq \sqrt{\beta_1(q)} a_R(q,r) a_{BS}^H(q) \in \mathbb{C}^{N\times M}, \qquad (17)$$

where $a_{BS}$ is the antenna array response at the BS. The obtained channel between the RIS and the target position w is given by:

$$h(q,w,r) \triangleq \sqrt{\beta_2(q,w)} a_T(q,w,r) \in \mathbb{C}^{N\times 1}. \qquad (18)$$

From Eq. (17) and (18), the receive signal at the intended location co may be written as the following:

$$y(q, w, r, \Theta, v) = h^H(q, w, r)\Theta G(q, r)vs + n, \qquad (19)$$

where $v \in \mathbb{C}^M$ is the precoding vector at the BS, $\Theta = \text{diag}(\alpha_1 e^{j\theta_1}, \ldots, \alpha_N e^{j\theta_N})$ represents the phase shifts (to be optimized) at the RIS with $|\alpha_\ell|^2 \leq 1$ and $\theta_\ell \in (0, 2\pi)$, $\forall \ell$. Furthermore, $s \in \mathbb{C}$ s is the transmitted symbol with $\mathbb{E}[|s|^2]=1$ and $n \sim \mathcal{CN}(0, \sigma_n^2)$ is the noise term that is assumed to be independent from s.

The RIS may be used to compensate flight effects. For instance, the present invention may be used to guarantee coverage over a given target area A, e.g., ensuring that each receiver obtains a sufficiently high SNR, by taking into account the undesired rotations of the surface of the RIS caused by perturbations on the UAV. In this regard, in the following, the received SNR is defined at a given target location w and an effective optimization problem may be formulated that pursues the worst SNR maximization among all possible target locations, accounting for possible perturbations. Therefore, the present invention provides a solution to such problem(s) based on semidefinite relaxation (SDR) and Monte Carlo sampling denoted as RIS to compensate flight effects (RiFe).

The below describes the problem formulation. For instance, the received SNR at position w, may be given by the following:

$$SNR(q, w, r, \Theta, v) = \frac{|h^H(q, w, r)\Theta G(q, r)v|^2}{\sigma_n^2} \quad (20)$$

$$= \frac{|a_T^H(q, w, r)\Theta a_R(q, r)a_{BS}^H(q)v|^2}{\|q\|^2\|q-w\|^2\sigma_n^2/\beta_0^2}. \quad (21)$$

The present invention may be used to maximize the worst-case SNR within the target region via the proper choice of both beamforming vector at the BS and the RIS configuration while accounting for the perturbations, which are identified by means of r, e.g., Problem 1 (P_1)

$$\max_{\Theta,v} \min_{\substack{w \in \mathcal{A} \\ w \sim f_W(w)}} \mathbb{E}[SNR(q, w, r, \Theta, v)] \quad (22)$$

s.t. $\|v\|^2 \leq P;$ (23)

$[\Theta]_{i\ell} = 0, \forall i \neq \ell;$ (24)

$|[\Theta]_{ii}|^2 \leq 1, i = 1, \ldots, N;$ (25)

where P is the power budget available at the BS and the expectation is calculated over the random variable (RV) r. In some instances, the constraints on the matrix $\Theta$ ensure that the RIS remains a passive structure without amplifying the incoming signal. Problem 1 is highly complex to tackle due to its non-convex nature and the difficulty in treating any generic form of the pdf f(w). In the following, a simple and efficient solution based on Monte Carlo sampling and SDR is described to solve the problem.

A canonical solution (RiFe) is described below. Let $\bar{a}_{BS}(v)=a_{BS}^H(q)v$ such that the numerator of the objective function of Problem 1 can be simplified as follows:

$$\mathbb{E}\left[|a_T^H(q, w, r)\Theta a_R(q, r)a_{BS}^H(q)v|^2\right] \quad (26)$$

$$= |\bar{a}_{BS}(v)|^2 \mathbb{E}\left[|a_T^H(q, w, r)\Theta a_R(q, r)|^2\right] \quad (27)$$

$$= |\bar{a}_{BS}(v)|^2 \mathbb{E}\left[\left|\sum_{i=1}^N a_{T,i}^*[\Theta]_{ii}a_{R,i}\right|^2\right], \quad (28)$$

where the dependency on q, w, and r has been dropped to ease the notation. The term $a^*_{T,i}[\Theta]_{ii}a_{R,i}$ in Eq. (28) may be expressed as $[\Theta]_{ii}\tilde{a}_i$, with $\tilde{a}_i=a^*_{T,i}a_{R,i}$. Note that $|\tilde{a}_i|=1$ and $\angle\tilde{a}_i=\tilde{\phi}_i=\phi_i^T-\phi_i^R$. Let $\theta=\text{diag}(\Theta)$ such that Eq. (28) may be rewritten as $$|\bar{a}_{BS}(v)|^2 \mathbb{E}\left[|\theta^T \tilde{a}(q, w, r)|^2\right] \quad (29)$$

$$= |\bar{a}_{BS}(v)|^2 \mathbb{E}\left[\theta^T \tilde{a}(q, w, r)\tilde{a}^H(q, w, r)\theta^*\right] \quad (30)$$

-continued $$= |\bar{a}_{BS}(v)|^2 \theta^T \mathbb{E}\left[\tilde{a}(q, w, r)\tilde{a}^H(q, w, r)\right]\theta^* \quad (31)$$

$$= |\bar{a}_{BS}(v)|^2 \theta^T \tilde{A}(q, w)\theta^*, \quad (32)$$

where the elements of the matrix $\tilde{A}(q, w)$ are defined as $[\tilde{A}(q,w)]_{i\ell} = \mathbb{E}[\tilde{a}_i\tilde{a}_\ell^*] = \mathbb{E}[e^{j(\tilde{\phi}_i-\tilde{\phi}_\ell)}]$. The matrix $\tilde{A}(q, w)$ may then be approximated and/or estimated at the BS-side via a separate control channel, which will be described in further detail below.

The phases $\{\tilde{\phi}_i-\tilde{\phi}_\ell\}_{i,\ell=1}^N$ corresponding to the element in position (i, $\ell$) of matrix $\tilde{A}(q, w)$ may be expressed as a function of r as the following $$\tilde{\phi}_i - \tilde{\phi}_\ell = \frac{2\pi}{\lambda}[(\eta_1\cos\psi_z + \eta_2\sin\psi_z)\cos\psi_y + \eta_3\sin\psi_y](x_i - x_\ell) + \quad (33)$$

$$\frac{2\pi}{\lambda}[(\eta_2\cos\psi_z - \eta_1\sin\psi_z)\cos\psi_x + \eta_3\sin\psi_x](y_i - y_\ell),$$

with $$\eta_1 = \cos\theta_T\cos\phi_T - \cos\theta_R\cos\phi_R, \quad (34)$$

$$\eta_2 = \cos\theta_T\sin\phi_T - \cos\theta_R\sin\phi_R, \quad (35)$$

and $$\eta_3 = \sin\theta_T - \sin\theta_R. \quad (36)$$

Problem 1 may then be reformulated as the following:

$$\max_{\theta,v} \min_{\substack{w \in \mathcal{A} \\ w \sim f_W(w)}} \frac{|a_{BS}^H(q)v|^2\theta^T\tilde{A}(q, w)\theta^*}{\|q - w\|^2} \quad (37)$$

s.t. $\begin{matrix}\|v\|^2 \leq P; \\ |\theta_i|^2 \leq 1, \forall i\end{matrix}$.

For instance, Eq. (37) describes an expression of the expected SNR in position w, where the expectation is taken over the unknown and unwanted perturbations in the UAV position and orientation. The matrix variable $\Theta$ is substituted with the vector variable $\theta$, which is simply the diagonal of the latter as this simplifies the notation. Note that in the above, the optimal value of the precoder v adopted at the BS does not depend on w and, when the vector of the RIS parameters $\theta$ is kept constant, may be optimized by aligning it to the direction of departure of the link between the BS and the RIS. Hence, by noting that $\|a_{BS}(q)\|^2=M$ and by using maximum ratio transmission (MRT), the equation may be set as:

$$v = \sqrt{\frac{P}{M}} a_{BS}(q). \quad (38)$$

Thus, this leaves the following optimization problem on RIS parameters:

Problem 2(P_FD)

$$\max_{\theta} \min_{\substack{w \in \mathcal{A} \\ w \sim f_W(w)}} \frac{\theta^T \tilde{A}(q, w) \theta^*}{\|q - w\|^2} \quad (39)$$

$$\text{s.t. } |\theta_i|^2 \leq 1, \quad \forall i. \quad (40)$$

In Problem 2, the beamforming vector has been fixed at the transmitter as in Eq. (38). Hence, the remaining optimization problem is a function of the RIS configuration only (e.g., the vector $\theta$). Problem 2 is still non-convex due to the maximization of a quadratic function in $\theta$. An efficient solution may be found by employing SDR as detailed in the following. Let $\overline{\Theta} \triangleq \theta \theta^H$, which allows Problem 2 to be reformulated as the following:

$$\max_{\overline{\Theta} \succeq 0} \min_{\substack{w \in \mathcal{A} \\ w \sim f_W(w)}} \frac{tr(\tilde{A}^*(q, w)\overline{\Theta})}{\|q - w\|^2} \quad (41)$$

$$\text{s.t. } \begin{array}{l} \text{diag}(\overline{\Theta}) \leq 1; \\ \text{rank}(\overline{\Theta}) = 1. \end{array}$$

Compared to Problem 2, the above has defined the matrix variable $\overline{\Theta}$, which is now the new optimization variable. Note that Problem 2 is mathematically equivalent to Eq. (41); however, Eq. (41) is in the canonical form used for SDR.

In order to cope with any given general probability density function of the distribution of the receivers $f_W(w)$, a Monte Carlo sampling approach may be applied whereby a number of sample points $N_w$ are dropped within the target area A and according to a-priori statistics $f_W(w)$. If $N_w$ is sufficiently high, a correct sampling of the pdf of the receivers in the target area is obtained. Note that $N_w$ is expressed as a trade-off between complexity and accuracy of the proposed approach. Let $\mathcal{A}$ be the set of such points such that the above problem can be solved by standard semidefinite programming (SDP) (e.g., CVX) in its relaxed convex form, e.g., by ignoring the nonconvex rank constraint. The solution obtained by SDP can be projected onto a rank-one space by Gaussian randomization or eigenvalue decomposition. Thus, an approximate solution to Problem 2 may be found by solving the following:

Problem 3 (P_FD_SDR)

$$\max_{\overline{\Theta} \succeq 0} \min_{\substack{w \in \mathcal{A} \\ w \sim f_W(w)}} \frac{tr(\tilde{A}^*(q, w)\overline{\Theta})}{\|q - w\|^2} \quad (42)$$

$$\text{s.t. diag}(\overline{\Theta}) \leq 1. \quad (43)$$

In Problem 3, the non-convex rank constraint has been relaxed, which appeared in Eq. (41). In this way, the resulting problem is convex and may be solved via standard SDP.

The proposed method is described in Algorithm 1. In particular, Algorithm 1 describes the RiFe. In step 1, a processor (e.g., the RIS configuration processor 302) may initialize $N_w$. In step 2, the processor may form set $\mathcal{A}$ by dropping $N_w$ points $\{w_i\}_{i=1}^{N_w}$ according to $f_W(w)$. In step 3, the processor may solve Problem 3 and obtain $\Theta$. In step 4, the processor may extract $\theta$ from $\overline{\Theta}$ via Gaussian randomization. In some instances, Algorithm 1 and RiFe may be implemented in a distributed way at the involved entities. In particular, the RIS configuration processor 302 may be implemented at the transmitter, which may receive inputs from blocks 304 and 306 that are separate control channels to the UAV flight controller and the rest of the network, respectively. In addition, the output of block 302 may be fed to the RIS controller via a separate control channel. The RIS controller is then in charge of transforming the output of block 302 into the input voltages to be applied at the RIS elements. The output of block 302 may have long-term validity since it is based on statistics. Hence, the whole process may be repeated on a relatively long time scale.

The complexity of RiFe is essentially dictated by Problem 3, which is solved by a bisection method typically requiring 10 to 12 iterations each one having a complexity of $\mathcal{O}(\sqrt{N}(N^6+N^3))$.

Below, another embodiment of the present invention is described that considers the practical considerations. In particular, a more practical solution is described aiming at simplifying the optimization procedure described in Algorithm 1. Specifically, Problem 3 requires to be solved every time the statistics of r are no longer valid which, given the need to use SDP, may be excessively time-consuming when the statistics change rapidly. As such, below describes a suboptimal yet simple closed-form solution to Problem 3.

Given a total number of sampling points $N_w$, the objective is to maximize the worst SNR among the associated ones in set $\mathcal{A}$. Hence, the matrix $\overline{\Theta}$ may be fixed to a weighted combination of the $\tilde{A}^*(q, w)$ matrices as:

$$\overline{\Theta} = \sum_{i=1}^{N_w} \lambda_i \tilde{A}^*(q, w_i). \quad (44)$$

The weights $\lambda_i$ need to be chosen such that more power is allocated along the propagation directions corresponding to the point exhibiting the worst SNR with respect to the others in set $\mathcal{A}$ and such that the resulting matrix $\overline{\Theta}$ is a positive semi-definite matrix whose diagonal elements are less than or equal to 1. Since the received SNR depends largely on the distance from the target point to the UAV location, the weights may be set as:

$$\lambda_i = \frac{1}{\bar{\lambda}} \|q - w_i\|, \quad (45)$$

where the constant factor $\bar{\lambda}$ is properly chosen to guarantee the aforementioned constraints on the matrix $\overline{\Theta}$. In this regard, note that $\tilde{A}^*(q, w_i)$ is a positive semi-definite matrix and $\lambda_i > 0$, $\forall i$ thus ensuring that $\overline{\Theta}$ is a positive semi-definite matrix as well. Moreover, the value of $\bar{\lambda}$ is found by constraining the diagonal of $\overline{\Theta}$ to 1 as:

$$\text{diag}(\overline{\Theta}) = \sum_{i=1}^{N_w} \lambda_i 1, \quad (46)$$

which ensures that the RIS is a passive structure overall. Finally, the constant factor $\bar{\lambda}$ may be set as:

$$\bar{\lambda} = \sum_{i=1}^{N_w} \|q - w_i\|. \tag{47}$$

By substituting Eqs. (45) and (47) into Eq. (44), $\bar{\Theta}$ may be obtained as:

$$\bar{\Theta} = \frac{1}{\sum_{i=1}^{N_w} \|q - w_i\|} \sum_{i=1}^{N_w} \|q - w_i\| \tilde{A}^*(q, w_i). \tag{48}$$

The RIS parameters in the vector $\theta$ may be obtained from Eq. (48) by Gaussian randomization or eigenvalue decomposition.

The proposed method is described in Algorithm 2 and is denoted as Fair-RiFe. In step 1, a processor (e.g., the RIS configuration processor 302) may initialize $N_w$. In step 2, the processor may form set $\bar{\mathcal{A}}$ by dropping $N_w$ points $\{w_i\}_{i=1}^{N_w}$ according to $f_w(w)$. In step 3, the processor may set $$\lambda_i = \frac{1}{\bar{\lambda}} \|q - w_i\| \forall w_i \in \bar{\mathcal{A}}$$

with $\bar{\lambda}=\sum_{i=1}^{N_w}\|q-w_i\|$. In step 4, the processor may fix $\bar{\Theta}=\sum_{i=1}^{N_w}\lambda_i\tilde{A}^*(q-w_i)$. In step 5, the processor may extract $\theta$ from $\bar{\Theta}$ via Gaussian randomization. In other words, the Fair-RiFe algorithm may be implemented similar as RiFe described above. However, there may be a difference in the implementation of block 310 as the Fair-RiFe has a simpler computational point of view compared to the RiFe embodiment. In Fair-RiFe, block 310 is a closed-form equation whereas in RiFe, it may require the use of SDP.

FIG. 7 graphically shows the radiation pattern at the RIS along the azimuth and elevation directions obtained using multiple methods according to embodiments of the present invention. In particular, FIG. 7 shows the radiation pattern at the RIS along the azimuth and elevation directions obtained with RiFe, Fair-RiFe, and with the agnostic scheme for different values of the UAV orientation perturbations, where $\sigma=\sigma_{\psi,x}=\sigma_{\psi,y}=\sigma_{\psi,z}$ and with the default values in Table I, which is described below. In FIG. 7, the radiation pattern at the RIS along the azimuth and elevation directions obtained with RiFe, Fair-RiFe and with an agnostic solution is compared that does not take into account the UAV perturbations. As expected, the agnostic method points towards the center of the target area, regardless of the entity of the drone perturbations whereas, both RiFe and Fair-RiFe tend to spread the energy over a wider angular span as the perturbations increases.

A special case of deterministic UAV movements is described below. In particular, a special case of the above-described scenario is considered, wherein the UAV is moving with given direction and velocity. In this case, the statistics of r changes rapidly together with drone movements, which requires an updated matrix $\tilde{A}(q, w)$ and the solution of Problem 1. As a result of the movement of the UAV, the surface of the RIS exhibits an (expected) inclination of $\hat{\psi}_x$, $\hat{\psi}_y$, and $\hat{\psi}_z$ along the x, y, and z axes, respectively. The expected inclination of the surface based on the UAV speed may be readily calculated via a flight controller. In this case, the present invention is readily applicable by simply substituting the coefficients in Eqs. (34)-(35) with $$\eta_1 = \cos\theta_T\cos(\phi_T - \hat{\psi}_z) - \cos\theta_R\cos(\phi_R - \hat{\psi}_z), \tag{49}$$

and $$\eta_2 = \cos\theta_T\sin(\phi_T - \hat{\psi}_z) - \cos\theta_R\sin(\phi_R - \hat{\psi}_z), \tag{50}$$

respectively. Moreover, in this case the phase term in position (i, $\ell$) of matrix $\tilde{A}(q, w)$ is expressed as:

$$\phi_i - \phi_\ell = \frac{2\pi}{\lambda}\Big[\big(\eta_2\cos\hat{\psi}_x\cos\psi_z - \eta_1\cos\hat{\psi}_x\sin\psi_z + \eta_3\sin\hat{\psi}_x\big)\cos\psi_x - \tag{51}$$

$$\big(\eta_2\sin\hat{\psi}_x\cos\psi_z - \eta_1\sin\hat{\psi}_x\sin\psi_z - \eta_3\cos\hat{\psi}_x\big)\sin\psi_x\Big] \times (y_i - y_\ell) -$$

$$\frac{2\pi}{\lambda}\Big[\big(\eta_1\cos\hat{\psi}_y\cos\psi_z + \eta_2\cos\hat{\psi}_y\sin\psi_z + \eta_3\sin\hat{\psi}_y\big)\cos\psi_y -$$

$$\big(\eta_1\sin\hat{\psi}_x\cos\psi_z + \eta_2\sin\hat{\psi}_y\sin\psi_z - \eta_3\cos\hat{\psi}_y\big)\sin\psi_y\Big](x_i - x_\ell).$$

Hence, both Algorithms 1 and 2 described above may be alternatively applied without any further modification.

Below describes a performance evaluation of using embodiments of the present invention. In particular, numerical results are described below to assess the performance of the above embodiments by means of ad-hoc MATLAB® simulations. One BS with M=16 antenna elements is placed at coordinates (0, 0, 10) m, while the RIS is installed on a drone that is located at coordinates (25, 25, $h_d$) m, where the altitude of the drone is set to $h_d$=50 m, unless otherwise stated. The RIS is equipped with $N_x \times N_y$ antenna elements, with $N_x \times N_y$=10, unless otherwise stated. Hence, the total number of RIS elements is $N=N_xN_y$=100 with an interdistance of $$d = \frac{\lambda}{2}.$$

In the simulations, the inter-distance of $\lambda/2$ is considered that allows to neglect the mutual coupling effect between RIS elements. The target area wherein first responder teams and/or victims are located is centered at coordinates (50, 20, 0) m. The BS transmit power is set to P=24 decibel-milliwatts (dBm) and the average noise power to $\sigma_n^2$=−80 dBm. The variances of the perturbations of the drone orientation along the x, y, and z axes may be equal to $\sigma_{104\ x}=\sigma_{\psi,y}=\sigma_{104\ z}=\sigma$, with $\sigma$ ranging from 0° to 20°. Lastly, the working frequency is set to f=30 GHz and the channel gain at a reference distance of 1 m is assumed to be equal to $\beta_0$=1. All simulation settings are listed in Table I, unless otherwise stated. The numerical results for each simulation instance are averaged over 5,000 realizations of the drone perturbations, e.g., of the vector r, and the number of sample points necessary for Monte Carlo sampling of the distribution of the receivers is set to $N_w$=200. Lastly, the obtained results over 10 instances of random locations of the receivers in the target area is averaged. Numerical simulations are carried out on an INTEL i7-8665U CPU at 1.90 GHz and 32 GB RAM 8-core machine.

Below shows Table I, which are the default simulation settings:

TABLE 1

| Parameter | Description | Default Value |
| --- | --- | --- |
| q | Drone coordinates | (25, 25 $h_d$) |
| $h_d$ | Drone altitude | 50 m |
| b | BS coordinates | (0, 0, 10) |
| $c_A$ | Center of target area | (50, 20, 0) |
| N | Number if RIS elements | 100 |
| M | Number of BS antenna elements | 16 |
| P | BS transmission power | 24 dBm |
| $\sigma_n^2$ | Noise power | −80 dBm |
| f | Working frequency | 30 GHz |
| d | RIS element spacing | $\frac{\lambda}{2}$ |
| σ | Drone orientation perturbation | 20° |
| $\beta_0$ | Channel gain at 1 m | 1 |

The robustness to perturbations is described below. First, the case where the location of the first responder team in the area is perfectly known and the drone is affected by orientation perturbation is considered. The robustness of the present invention is highlighted against the uncertainty on the drone orientation. The RiFe is compared against an agnostic procedure that optimizes the RIS parameters by neglecting such perturbations and assuming a perfectly-stable flight, denoted as agnostic. 10 users that uniformly dropped in a circular target area of radius R={20, 35} m is considered.

FIG. 8 graphically shows the robustness of the RIS to compensate flight effects (RiFe) method and the agnostic method to drone perturbations according to embodiments of the present invention. In particular, FIG. 8 shows the average minimum SNR obtained with RiFe and with the agnostic solution for different values of the radius r of the target area and the drone altitude $h_d$. FIG. 8 compares the performances of RiFe against the agnostic methods in terms of the minimum SNR received by the first responder team in the target area. It is worth noting that drone oscillations results in a reduction of the received SNR, which is mainly caused by the misalignment of the reflected beams (on the RIS) with respect to the users to be covered in the target area. Notably, RiFe mitigates such misalignment effects by optimizing the RIS parameters as a function of the statistics of such oscillations. Indeed, the present invention tends to generate wider beams compared to the agnostic solution, e.g., it better spreads the radiated power over the target area thus compensating an undesired misalignment.

In some instances, RiFe performance gains are less evident as the dimension of the target area increases. When points to be covered are well separated, reflected beams on the RIS focus on each target point. Vice versa, if the receivers are in close proximity then RiFe tends to cover all the target points with a single wide beam. This results in a similar RIS configuration compared to the agnostic solution, thus reducing the overall performance gain in terms of received SNR.

Additionally, a trade-off between the effectiveness of the oscillation compensation mechanism of RiFe and the magnitude of such oscillations is observed. Indeed, the two considered methods produce similar gains in the two extreme cases when the magnitude of the perturbations is low because of a relatively low drone altitude or small values of $\sigma_\psi$, and when the size of perturbations is large because of high altitude of the drone or a large value of $\sigma_\psi$. The rationale behind this behavior is the following: when perturbations are limited, their corresponding effect is negligible, thus the improvement of the proposed compensation mechanism is unreasonable. Conversely, when the altitude is high, small oscillations may result in large deviations of the corresponding beams with respect to the desired pointing direction. In this case, RiFe will generate wide beams to spread the irradiated power over a larger angular span thereby resulting in an inevitable reduction of the received signal power. Such a behavior is highlighted in FIG. 9, which shows the cumulative density functions (CDF) of the received SNR. FIG. 9 graphically shows the trade-off between performance improvement and perturbation magnitude for the RiFe and agnostic methods according to embodiments of the present invention. As shown, the CDF of the received SNR within a target area of radius r=35 m obtained with RiFe and the agnostic solution for different values of the UAV orientation perturbation a and the drone altitude $h_d$. In other words, FIG. 9 shows the cumulative density functions (CDF) of the received SNR.

Figure 10:
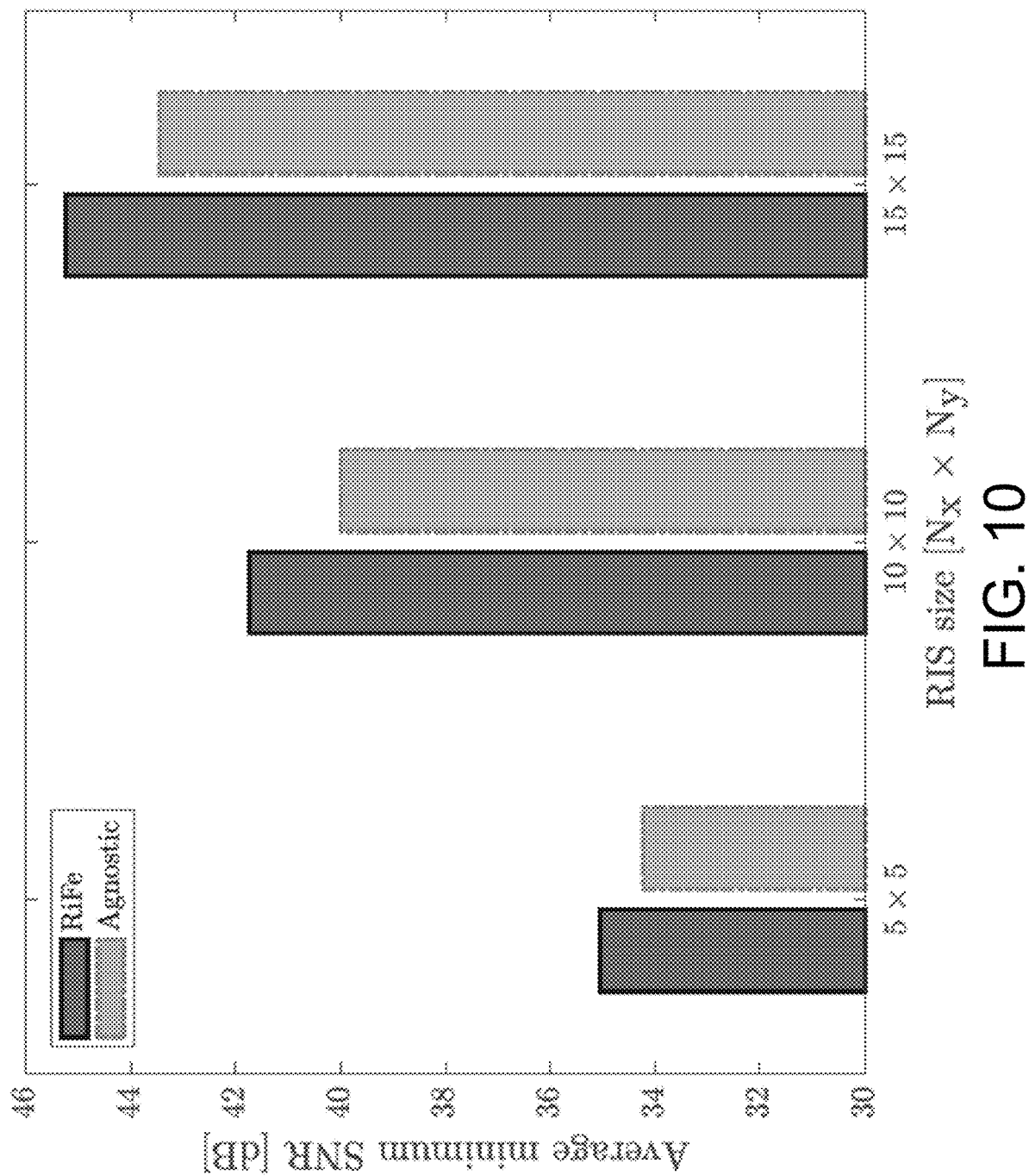
FIG. 10 graphically shows a bar graph describing the robustness of the RIS to compensate flight effects (RiFe) method and the agnostic method to drone perturbations according to embodiments of the present invention.

Additional tests were performed to take into account the effect of the RIS size by varying the number of elements N. FIG. 10 graphically shows a bar graph describing the robustness of the RIS to compensate flight effects (RiFe) method and the agnostic method to drone perturbations according to embodiments of the present invention. As shown, the average minimum SNR obtained with RiFe and with the agnostic solution for different setting of the number of RIS elements N with the UAV altitude set to $h_d$=50 m, a target area with radius r=35 m, and UAV perturbation σ=5°. In other words, FIG. 10 compares the performances of RiFe against the agnostic scheme/method in terms of minimum SNR. The overall increasing trend of the achieved minimum SNR according to the number of elements is shown. This due to the ability to focus—which is proportional to its dimension—that reflects on the directionality of the reflected beams. However, the more the energy is focused towards the target points, the higher the effect of misalignment due to the drone orientation perturbation. This results, in turn, in the gap between the performances of RiFe and agnostic optimization schemes/methods, which increases according to the available number of elements, thus highlighting the importance of a robust RIS configuration to combat drone perturbations.

Further, the multicast rate resulting from the two different RIS optimization schemes considered is compared. Multicast rate is an important key performance indicator in emergency scenarios, considering the need to propagate useful information to the overall first responder team in the shortest possible time. The obtained comparison results is showed in Table II to emphasize the benefits of robust optimization strategies to improve the overall system performance and effectiveness. In particular, Table II shows the multicast rate performance in bits per second (BPS)/hertz (Hz) considering different target area radii and UAV orientation perturbations. The bold and plain values in brackets indicate the performance of RiFe and agnostic optimization schemes/methods, respectively.

TABLE II

| Target Area | Perturbation-RiFe (Agnostic) | | |
| --- | --- | --- | --- |
| | Low | Medium | High |
| Radius = 20 m | 25 (24) | 24 (23) | 24 (22) |
| Radius = 35 m | 24 (22) | 24 (22) | 23 (22) |

The analysis of location-unaware solutions is described below. When the BS aims at serving a number of victims whose position is unknown, an objective of the present invention may be to provide a minimum SNR within the target area to ensure an adequate signal coverage. In some examples, the distribution of the victims in the target area is assumed to be known and follows a symmetric and independent bivariate normal distribution centered in a given point C and with associated standard deviations along the x and y axes equal to $\sigma_{w,x}=\sigma_{w,y}=\sigma_w$. The value of $\sigma_w$ is set to $\{2.5, 10\}$ m, which represent two possible situations, namely victims located in a predefined collection point, and a more sparse distribution around the disaster location. Note that the values of $\sigma_w$ correspond to an area of 80 m$^2$ and 1200 m$^2$, respectively wherein the 95% of the victims are located. Additionally, the present invention is compared against 3D beam flattening.

Figure 11:
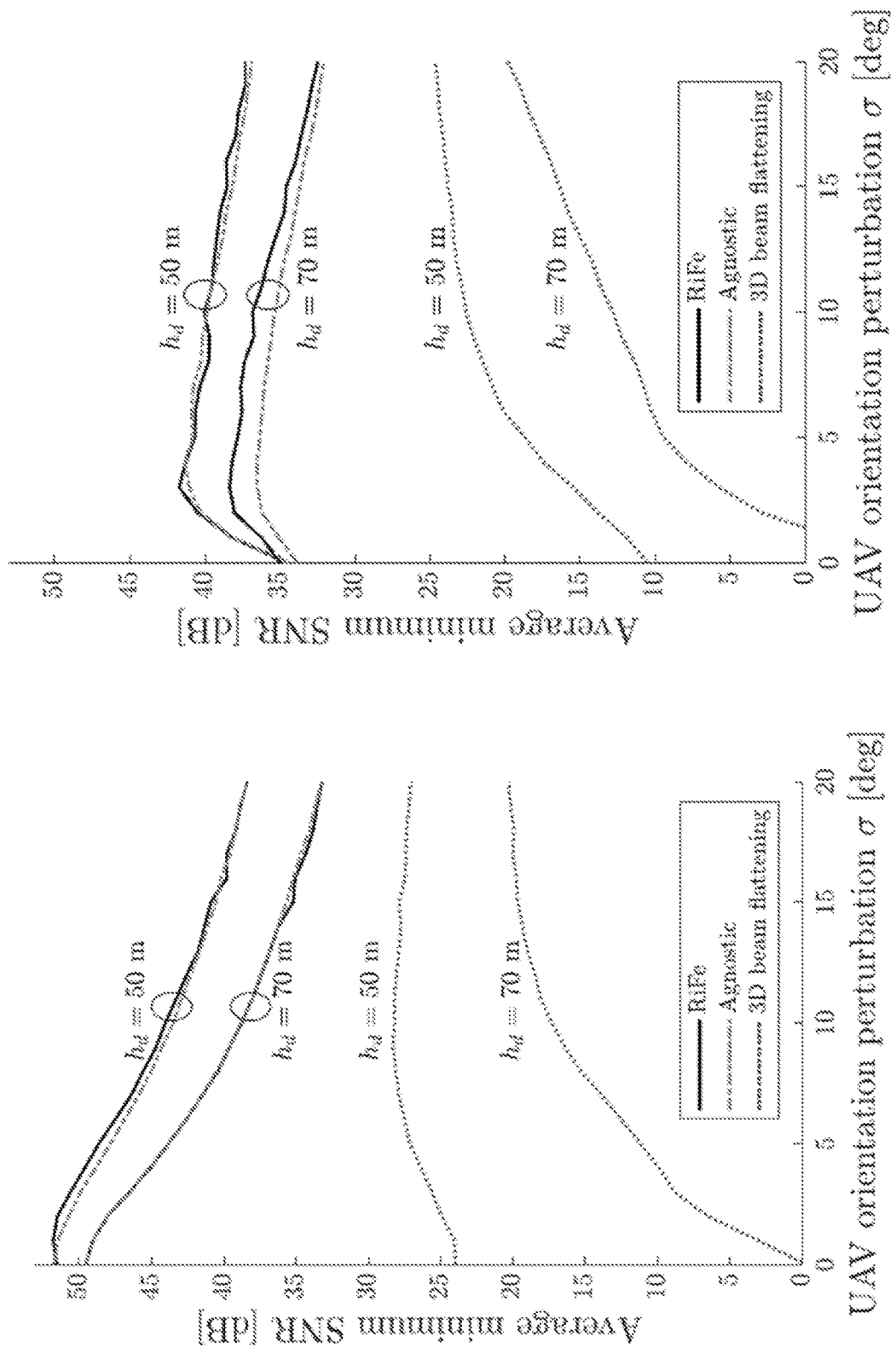
FIGS. 11a and 11b graphically show the average minimum signal to noise ratio (SNR) obtained using RiFe method, the agnostic method, and with 3D beam flattening according to embodiments of the present invention.

FIG. 11 graphically shows the average minimum SNR obtained using RiFe method, the agnostic method, and with 3D beam flattening according to embodiments of the present invention. As shown, the agnostic solution and with 3D beam flattening over 95% of the users served for different values of the drone altitude $h_d$ and the user spread $\sigma_w$. In other words, FIG. 11 shows the achieved minimum SNR over the victims dropped in the area with different values of the drone perturbation, altitude of the drone and spread of the victims in the target area. After comparing the curves with low and high spread of victims in the area, it may be noted that the minimum received SNR has a decreasing trend as the drone perturbation increases. On the other hand, if the victims are more spread, the performance exhibits an increasing trend in the low perturbation regime. This behavior is due to the limited number of samples adopted for the Monte Carlo sampling of the distribution of the victims. Indeed, in the case of low spread of the location of the victims, the method of the present invention accurately represents the underlying distribution, which in turn results in an effective coverage of the area. Conversely, in the case of large spread of the locations of the victims, the limited number of samples results in a more sparse sampling of the distribution. As a result, the RIS configuration tends to focus the reflected energy towards the available samples instead of following the actual input distribution.

It is also noted that when the victims are widely spread, the beam patterns generated by RiFe result in a considerable SNR improvement since they are sufficiently spread to effectively cover the target area. On the other hand, when the victims are more concentrated, all considered algorithms produce beams that properly cover the target area. However, an overall increase of the SNR obtained with RiFe is observed. FIG. 12 describes this in more detail. FIG. 12 graphically shows the trade-off between performance improvement and perturbation magnitude according to embodiments of the present invention. As shown, the CDF of the received SNR obtained with RiFe and the agnostic solution with the drone at altitude $h_d$=50 m and for different values of victim spread $\sigma_w$. In other words, in FIG. 12, the CDF experienced by the victims in the target area considering different considered scenarios. As shown, the CDFs obtained with RiFe have a more pronounced slope with respect to the ones obtained with the agnostic solution because of larger beam patterns.

The practical evaluation is described below. In the previous numerical evaluation, the effectiveness of RiFe to obtain a robust RIS configuration is demonstrated, which is able to mitigate the effect of the inherent instability of the drone in flight. To conclude, the performance of RiFe algorithm is compared with the Fair RiFe solution described above, in terms of target area coverage quality as well as computational cost of the optimization process. Further, an agnostic version of Fair RiFe in the numerical evaluation, namely Fair-agnostic, where Algorithm 2 is solved neglecting the drone perturbation statistic is also used. The same scenario as described above is considered.

Figure 13:
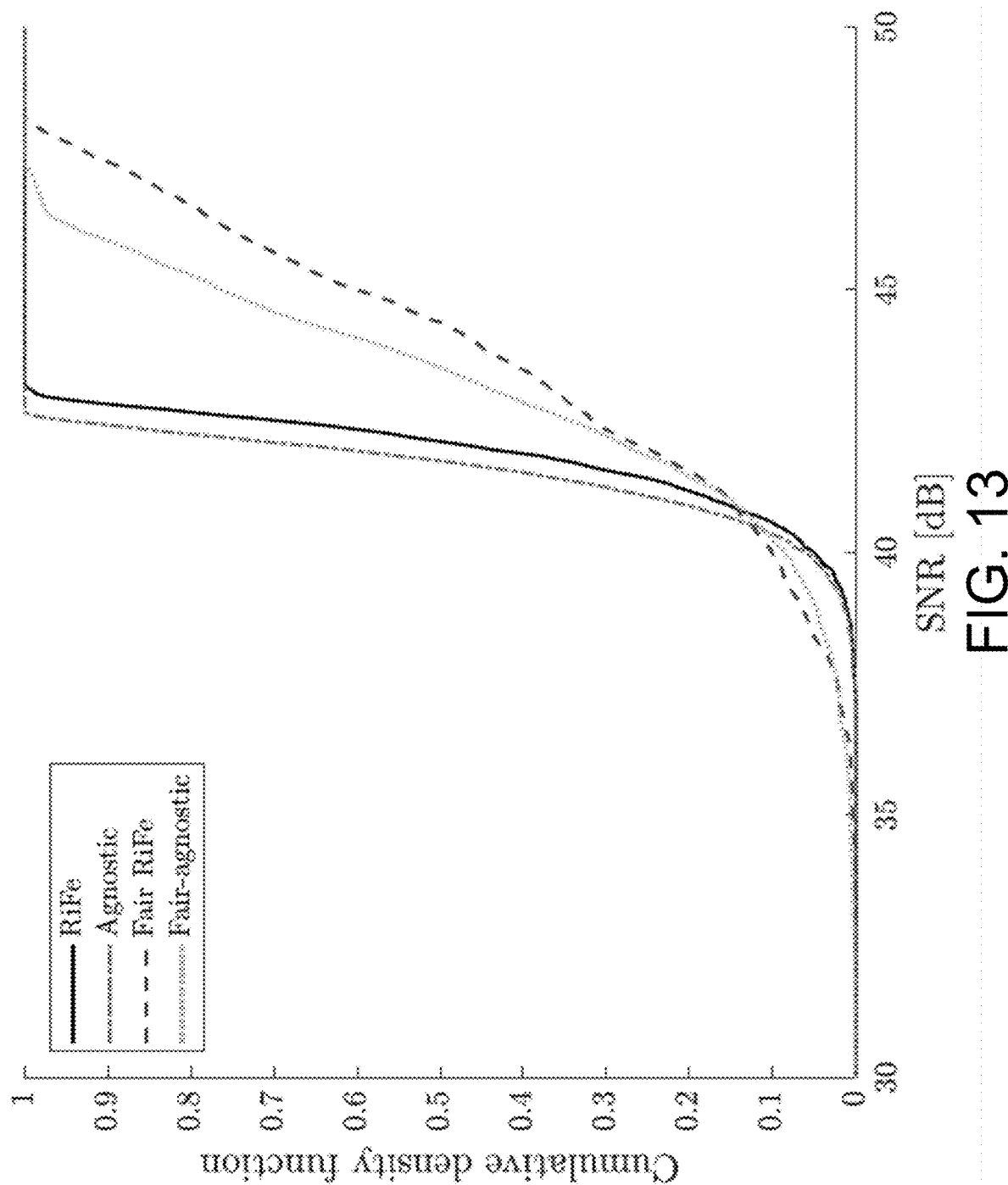
FIG. 13 graphically shows the cumulative density function (CDF) of the received SNR obtained using the RiFe method, the agnostic method, the Fair RiFe method, and the Fair-agnostic method according to embodiments of the present invention.

FIG. 13 graphically shows the cumulative density function (CDF) of the received SNR obtained using the RiFe method, the agnostic method, the Fair RiFe method, and the Fair-agnostic method according to embodiments of the present invention. The CDF of the received SNR obtained with RiFe, the agnostic solution, Fair RiFe and the Fair-agnostic scheme is shown with the drone altitude set to $h_d$=50 m, the victim spread equal to $\sigma_w$=2.5 m, and UAV perturbation $\sigma$=5°. In other words, FIG. 13 compares the CDF of the victims SNR experienced over a target area considering different proposed solutions. From the results, it can be noticed that the CDFs obtained with the Fair RiFe and Fair agnostic algorithms exhibit a less-marked slope than their optimal counterpart. Thus, they produce a less-homogeneous distribution of the radiated power over the area than their optimal counterpart due to the suboptimal RIS configuration. Upon comparing the Fair RiFe and the Fair agnostic performance, it can be noticed that, for relatively low SNR values, distributions are very similar to each other, thus leading to similar performances in terms of minimum SNR provided. Vice versa, considering relatively high value of SNR, it can be noticed that the overall delivered SNR is higher with the Fair RiFe solution. Therefore, it still provides a performance improvement by considering the drone perturbation statistics in the optimization process.

Additionally, the computational time is assessed, which is described in FIG. 14. FIG. 14 graphically shows a comparison of computational time of RiFe method and Fair-RiFe method according to embodiments of the present invention. In particular, the overall optimization time needed by RiFe and Fair RiFe method is compared while varying the number of points within the target area $N_w$ as well as the size of the onboard RIS N. In FIG. 14a, it can be noticed that a dramatic reduction of the optimization time when considering Fair RiFe against RiFe method. The reason behind such an improvement relies on the fact that Fair RiFe does not involve an optimization process to obtain the solution. It can also be seen that the Fair RiFe optimization time shows a limited growth with respect to the number of points $N_w$ against RiFe solution. Therefore, in the case it is required to sample the target area (i.e., unknown position of the victims), it is suitable for a fine-grained sampling of the victim distribution. FIG. 14b provides the optimization time against the number of RIS elements N. Fair RiFe, which keeps the optimization time almost constant, outperforms RiFe, whose optimization time has an exponential growth with respect to the number of RIS elements. Thus, Fair RiFe allows for a quick configuration of the RIS thereby allowing to exploit the large-sized RIS in real scenario.

Related work and their deficiencies are described below. In particular, air-to-ground (A2G) communication has been recently promoted as an upcoming technology to deliver advanced and sophisticated services. Previously, effective A2G channel models were introduced while empirically validating them via realistic measurements. In particular, A2G can be implemented to support vehicular-based use-cases or to assist emergency communication. In both, an optimization-based approach is proposed to maximize the end-user coverage during the UAV flight.

Recently, an integration of RIS in UAV-based communications has been proposed as a means to enhance the performance of air-to-ground networks. Previously, a RIS was proposed to be used to increase the power of the received signal at the UAV. However, this approach has the limitation of requiring both the UAV and the user to lie on the same side with respect to the RIS.

Hence, a more feasible solution is to install a lightweight RIS on board the UAV. In this regard, several works have investigated the joint UAV trajectory and RIS parameters optimization problem. Previously, the a reinforcement learning approach was proposed to be employed based on Q-learning and neural networks to optimize both the trajectory of the UAV so as to maintain a line of sight (LoS) link with the ground user, and the RIS parameters to maximize the downlink transmission capacity. Previously, the maximization of the secure energy efficiency of the system was tackled via joint optimization of the trajectory of the UAV, the phase shifts at the RIS, the user association and transmit power by means of successive convex approximation.

A similar technique is also used to maximize the achievable rate of a single ground user. Previously, the problem of maximizing the worst SNR in a given target area to be covered by the BS by proper choice of the RIS configuration and placement of the aerial platform was considered. The resulting non-convex problem is solved by decoupling the optimization in maximizing the worst-case array gain to find the RIS configuration, and balancing the resulting angular span and path loss of the equivalent downlink channel to find the placement of the aerial platform.

However, existing works assume for simplicity that aerial platforms (e.g., UAV or HAP) has a perfectly stable flight. Based on real-life applications, in the present invention, the case where the UAV is subject to perturbations due to meteorological phenomena is considered. Specifically, a mathematical framework that takes into account undesired perturbations while continuously configuring the on-board RIS to pursue the overall performance maximization in terms of fairness within a target area and minimum experienced SNR is described.

As a result and in conclusion, agile and flexible air-to-ground networks represent the new frontier for reliable communications is described. In the present invention, UAVs are described equipped with passive devices, namely Reconfigurable Intelligent Surfaces (RISs), able to control the propagation properties of incoming signals to deliver connectivity in emergency scenarios while keeping the energy burden within affordable bounds.

Among other novel features, one novelty of the present invention with the RiFe solution is the robustness and reliability of the UAV communication channel by properly combating undesired flight effects, e.g., position perturbations and UAV orientation fluctuations. In addition to the optimization framework, another embodiment is described, Fair-RiFe, which in turn reduces the complexity of the optimal solution. Finally, an exhaustive simulation campaign has been conducted to validate the above framework where state-of-the-art solutions are significantly outperformed (e.g., 25 decibels (dB)).

A method for determining the matrix $\tilde{A}(q, w)$ is described below. The following describes a way to determine (e.g., estimate) matrix $\tilde{A}(q, w)$ by assuming that the oscillations of the UAV are small, e.g., that $\psi_x, \psi_y, \psi_z \approx 0$ and using a Taylor expansion such that $\cos(\psi) \approx 1 - \psi^2/2$ and $\sin(\psi) \approx \psi$. Let $\Delta x_{i\ell} = x_i - x_\ell$ and $\Delta y_{i\ell} = y_i - y_\ell$ denote the difference in position between the i-th and $\ell$-th element of the RIS along the x and y axis, respectively and allows for approximating Eq. (33) as the following:

$$\tilde{\phi}_i - \tilde{\phi}_\ell \approx \frac{2\pi}{\lambda}\left(\eta_1 - \eta_2 \frac{\psi_z^2}{2} + \eta_2 \psi_z - \eta_1 \frac{\psi_y^2}{2} + \eta_3 \psi_y\right)\Delta x_{i\ell} + \frac{2\pi}{\lambda}\left(\eta_2 - \eta_2 \frac{\psi_z^2}{2} - \eta_1 \psi_z - \eta_2 \frac{\psi_x^2}{2} + \eta_3 \psi_x\right)\Delta y_{i\ell} \qquad (52)$$

where the terms that are $\mathcal{O}(\psi^3)$ are neglected. In such instances, let $f_{\psi_x}(\psi_x), f_{\psi_y}(\psi_y), f_{\psi_z}(\psi_z)$ denote the pdf of $\psi_x, \psi_y,$ and $\psi_z$, respectively. Hence, it may be defined that:

$$\mathbb{E}\left[e^{j(\tilde{\phi}_i - \tilde{\phi}_\ell)}\right] = \int\int\int_{-\infty}^{+\infty} e^{j(\tilde{\phi}_i - \tilde{\phi}_\ell)} f_{\psi_x}(\psi_x) f_{\psi_y}(\psi_y) f_{\psi_z}(\psi_z) d\psi_x d\psi_y d\psi_z = \qquad (53)$$

$$\int\int\int_{-\infty}^{+\infty} e^{j\frac{2\pi}{\lambda}\left(\eta_1\left(\frac{2-\psi_y^2-\psi_z^2}{2} + \frac{\eta_3}{\eta_1}\psi_y + \frac{\eta_2}{\eta_1}\psi_z\right)\Delta x_{i,\ell} + \eta_2\left(\frac{2-\psi_x^2-\psi_z^2}{2} + \frac{\eta_3}{\eta_2}\psi_x - \frac{\eta_1}{\eta_2}\psi_z\right)\Delta y_{i,\ell}\right)}$$

$$f_{\psi_x}(\psi_x) f_{\psi_y}(\psi_y) f_{\psi_z}(\psi_z) d\psi_x d\psi_y d\psi_z = e^{j\frac{2\pi}{\lambda}(\eta_1 \Delta x_{i,\ell} + \eta_2 \Delta y_{i,\ell})} = \qquad (54)$$

$$\int\int\int_{-\infty}^{+\infty} e^{j\frac{2\pi}{\lambda}\left(\eta_1\left(-\frac{\psi_y^2+\psi_z^2}{2} + \frac{\eta_3}{\eta_1}\psi_y + \frac{\eta_2}{\eta_1}\psi_z\right)\Delta x_{i,\ell} + \left(-\frac{\psi_x^2-\psi_z^2}{2} + \frac{\eta_3}{\eta_2}\psi_x - \frac{\eta_1}{\eta_2}\psi_z\right)\Delta y_{i,\ell}\right)}$$

$$f_{\psi_x}(\psi_x) f_{\psi_y}(\psi_y) \times f_{\psi_z}(\psi_z) d\psi_x d\psi_y d\psi_z. \qquad (55)$$

The integral in Eq. (55) can be seen as the product of three integrals in the form:

$$\int_{-\infty}^{\infty} \frac{1}{\sqrt{2\pi\sigma_\psi^2}} e^{-\frac{1}{2}\frac{\psi^2}{\sigma_\psi^2}} e^{j\left(-a_{i\ell}\frac{\psi^2}{2} + b_{i\ell}\psi\right)} d\psi = \frac{1}{\sqrt{2\pi\sigma_\psi^2}} \int_{-\infty}^{\infty} e^{-\frac{1}{2}\frac{\psi^2}{\sigma_\psi^2} - ja_{i\ell}\frac{\psi^2}{2} + jb_{i\ell}\psi} d\psi \qquad (56)$$

$$= \frac{1}{\sqrt{2\pi\sigma_\psi^2}} \int_{-\infty}^{\infty} e^{-\left(\frac{1+ja_{i\ell}\sigma_\psi^2}{2\sigma_\psi^2}\right)\psi^2 + ib_{i\ell}\psi} d\psi \qquad (57)$$

where the coefficients $a_{i,\ell}$ and $b_{i,\ell}$ are alternatively expressed as the following:

$$a_{i,\ell}^{(x)} = \frac{2\pi}{\lambda}\eta_2 \Delta y_{i,\ell} \tag{58}$$

$$a_{i,\ell}^{(y)} = \frac{2\pi}{\lambda}\eta_1 \Delta x_{i,\ell} \tag{59}$$

$$a_{i,\ell}^{(z)} = \frac{2\pi}{\lambda}(\eta_1 \Delta x_{i,\ell} + \eta_2 \Delta y_{i,\ell}) \tag{60}$$

and $$b_{i,\ell}^{(x)} = \frac{2\pi}{\lambda}\eta_3 \Delta y_{i,\ell} \tag{61}$$

$$b_{i,\ell}^{(y)} = \frac{2\pi}{\lambda}\eta_2 \Delta x_{i,\ell} \tag{62}$$

$$b_{i,\ell}^{(z)} = \frac{2\pi}{\lambda}(\eta_2 \Delta x_{i,\ell} + \eta_1 \Delta y_{i,\ell}), \tag{63}$$

respectively.

Let $c_{i,\ell} = \dfrac{1 + j a_{i,\ell}\sigma_\psi^2}{2\sigma_\psi^2}$ such that:

$$\int_{-\infty}^{\infty} \frac{1}{\sqrt{2\pi\sigma_\psi^2}} e^{-\frac{1}{2}\frac{\psi^2}{\sigma_\psi^2}} e^{j(-a_{i,\ell}\frac{\psi^2}{2} + b_{i,\ell}\psi)} d\psi = \frac{1}{\sqrt{2\pi\sigma_\psi^2}} \int_{-\infty}^{\infty} e^{-c_{i,\ell}\psi^2 + jb_{i,\ell}\psi} d\psi \tag{64}$$

$$= \frac{1}{\sqrt{2\pi\sigma_\psi^2}} \int_{-\infty}^{\infty} e^{-c_{i,\ell}\left(\psi^2 - \frac{jb_{i,\ell}}{c_{i,\ell}}\psi\right)} d\psi \tag{65}$$

$$= \frac{1}{\sqrt{2\pi\sigma_\psi^2}} \int_{-\infty}^{\infty} e^{-c_{i,\ell}\left[\left(\psi - \frac{jb_{i,\ell}}{2c_{i,\ell}}\right)^2 - \left(\frac{jb_{i,\ell}}{2c_{i,\ell}}\right)^2\right]} d\psi \tag{66}$$

$$= \frac{1}{\sqrt{2\pi\sigma_\psi^2}} \int_{-\infty}^{\infty} e^{-c_{i,\ell}\left(\psi - \frac{jb_{i,\ell}}{2c_{i,\ell}}\right)^2 - \frac{b^2}{4c}} d\psi \tag{67}$$

$$= \frac{e^{-\frac{b_{i,\ell}^2}{4c_{i,\ell}}}}{\sqrt{2\pi\sigma_\psi^2}} \int_{-\infty}^{\infty} e^{-c_{i,\ell}\left(\psi - \frac{jb_{i,\ell}}{2c_{i,\ell}}\right)^2} d\psi \tag{68}$$

Further, by noting that $\mathrm{Re}(c_{i,\ell}) > 0$ and by operating the following change of variable:

$$y_{i,\ell} = \psi - \frac{jb_{i,\ell}}{2c_{i,\ell}}; \tag{69}$$

$$\frac{dy_{i,\ell}}{d\psi} = 1; \tag{70}$$

$$d\psi = dy_{i,\ell}; \tag{71}$$

it may be determined have that:

$$\frac{e^{-\frac{b_{i,\ell}^2}{4c_{i,\ell}}}}{\sqrt{2\pi\sigma_\psi^2}} \int_{-\infty}^{\infty} e^{-c_{i,\ell}\left(\psi - \frac{jb_{i,\ell}}{2c_{i,\ell}}\right)^2} d\psi = \frac{e^{-\frac{b_{i,\ell}^2}{4c_{i,\ell}}}}{\sqrt{2\pi\sigma_\psi^2}} \int_{-\infty}^{\infty} e^{-c_{i,\ell} y_{i,\ell}^2} dy_{i,\ell} \tag{72}$$

$$= \frac{e^{-\frac{b_{i,\ell}^2}{4c_{i,\ell}}}}{\sqrt{2\pi\sigma_\psi^2}} \sqrt{\frac{\pi}{c_{i,\ell}}} \tag{73}$$

$$= \frac{e^{-\frac{b_{i,\ell}^2}{4\left(\frac{1+ja_{i,\ell}\sigma_\psi^2}{2\sigma^2}\right)}}}{\sqrt{2\pi\sigma_\psi^2}} \sqrt{\frac{2\pi\sigma_\psi^2}{1 + ja_{i,\ell}\sigma_\psi^2}} \tag{74}$$

$$= \frac{1}{\sqrt{1 + ja_{i,\ell}\sigma_\psi^2}} e^{-\frac{b_{i,\ell}^2 \sigma_\psi^2}{2(1 + ja_{i,\ell}\sigma_\psi^2)}} \tag{75}$$

where Eq. (73) is found by solving the Gaussian integral in Eq. (72). Hence, each element of the matrix $\tilde{A}(q, w)$ is approximated as the following:

$$[\tilde{A}(q,w)]_{i,\ell} \approx e^{j\frac{2\pi}{\lambda}(\eta_1 \Delta x_{i,\ell} + \eta_2 \Delta y_{i,\ell})} \frac{e^{-\frac{(b_{i,\ell}^{(x)})^2 \sigma_x^2}{2(1+j(a_{i,\ell}^{(x)})^2 \sigma_x^2)}}}{\sqrt{1+j(a_{i,\ell}^{(x)})^2 \sigma_x^2}} \times \frac{e^{-\frac{(b_{i,\ell}^{(y)})^2 \sigma_x^2}{2(1+j(a_{i,\ell}^{(y)})^2 \sigma_y^2)}}}{\sqrt{1+j(a_{i,\ell}^{(y)})^2 \sigma_y^2}} \frac{e^{-\frac{(b_{i,\ell}^{(z)})^2 \sigma_z^2}{2(1+j(a_{i,\ell}^{(z)})^2 \sigma_z^2)}}}{\sqrt{1+j(a_{i,\ell}^{(z)})^2 \sigma_z^2}} \tag{76}$$

In each of the embodiments described, the embodiments may include one or more computer entities (e.g., systems, user interfaces, computing apparatus, devices, servers, special-purpose computers, smartphones, tablets or computers configured to perform functions specified herein) comprising one or more processors and memory. The processors can include one or more distinct processors, each having one or more cores, and access to memory. Each of the distinct processors can have the same or different structure. The processors can include one or more central processing units (CPUs), one or more graphics processing units (GPUs), circuitry (e.g., application specific integrated circuits (ASICs)), digital signal processors (DSPs), and the like. The processors can be mounted to a common substrate or to multiple different substrates. Processors are configured to perform a certain function, method, or operation (e.g., are configured to provide for performance of a function, method, or operation) at least when one of the one or more of the distinct processors is capable of performing operations embodying the function, method, or operation. Processors can perform operations embodying the function, method, or operation by, for example, executing code (e.g., interpreting scripts) stored on memory and/or trafficking data through one or more ASICs. Processors can be configured to perform, automatically, any and all functions, methods, and operations disclosed herein. Therefore, processors can be configured to implement any of (e.g., all) the protocols, devices, mechanisms, systems, and methods described herein. For example, when the present disclosure states that a method or device performs operation or task "X" (or that task "X" is performed), such a statement should be understood to disclose that processor is configured to perform task "X".

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for establishing a direct communication using an unmanned aerial vehicle (UAV) with a reconfiguration intelligent surface (RIS), the method comprising:
   configuring RIS parameters using an optimization algorithm based on compensating for undesired oscillations of a position and an orientation associated with the UAV, the undesired oscillations of the position and the orientation associated with the UAV representing an unknown position and an unknown orientation of the UAV during an optimization time; and
   steering, based on the RIS parameters and by the RIS of the UAV, a signal reflection associated with a signal beam to a target area, wherein the signal beam is from a transmitter.

2. The method according to claim 1, further comprising:
   configuring, by the transmitter, beamforming to steer the signal beam towards the UAV, wherein the transmitter is a base station.

3. The method according to claim 1, wherein the RIS parameters are input voltages to one or more RIS elements that determine one or more phase shifts induced by the signal beam.

4. The method according to claim 1, wherein configuring the RIS parameters comprises determining the RIS parameters using the optimization algorithm that compensates for the undesired oscillations based on second-order statistics of perturbations associated with the UAV.

5. The method according to claim 4, wherein the optimization algorithm is based on mathematical optimization tools and/or artificial intelligence algorithms.

6. The method according to claim 1, further comprising:
   maintaining the direct communication between the target area and the transmitter using the RIS of the UAV based on:
      continuously configuring new RIS parameters to compensate for the undesired oscillations of the UAV; and
      continuously steering the signal reflection associated with the signal beam using the new RIS parameters.

7. The method according to claim 1, further comprising:
   obtaining sensor measurements from one or more sensors of the UAV, wherein the sensor measurements indicate one or more coordinates and the orientation of the UAV; and
   determining UAV statistics associated with the one or more coordinates and the orientation of the UAV,
   wherein configuring the RIS parameters is further based on the UAV statistics.

8. The method according to claim 7, wherein determining the UAV statistics associated with the one or more coordinates and the orientation of the UAV is based on building a rescaled histogram of the sensor measurements.

9. The method according to claim 1, further comprising:
   obtaining, from the transmitter, an area to be served; and
   performing area sampling based on the area to be served,
   wherein configuring the RIS parameters is based on performing the area sampling.

10. The method according to claim 9, wherein performing the area sampling comprises:
    based on information not being available for user positions within the area to be served, generating sample points belonging to the area as uniformly spaced points; and
    based on a probability density function (pdf) being available for the user positions within the area to be served, generating the sample points belonging to the area according to the pdf.

11. The method according to claim 1, wherein the transmitter is a base station, and wherein the method further comprises:
    obtaining, from the base station, coordinates of the base station,
    wherein configuring the RIS parameters are based on the coordinates of the base station.

12. The method according to claim 1, wherein configuring the RIS parameters is based on using a closed-form equation.

13. The method according to claim 1, wherein configuring the RIS parameters is based on using semidefinite programming (SDP).

14. A system for establishing a direct communication using an unmanned aerial vehicle (UAV) with a reconfiguration intelligent surface (RIS), the system comprising:
    a transmitter configured to transmit a signal beam to the UAV; and
    the UAV with the RIS, wherein the UAV is configured to:
       configure RIS parameters using an optimization algorithm based on compensating for undesired oscillations of a position and an orientation associated with the UAV, the undesired oscillations of the position and the orientation associated with the UAV representing an unknown position and an unknown orientation of the UAV during an optimization time; and
       steer, based on the RIS parameters and by the RIS of the UAV, a signal reflection associated with the signal beam to a target area.

15. A tangible, non-transitory computer-readable medium having instructions thereon which, upon being executed by one or more processors, alone or in combination, provide for execution of a method comprising:

configuring reconfiguration intelligent surface (RIS) parameters using an optimization algorithm based on compensating for undesired oscillations of a position and an orientation associated with an unmanned aerial vehicle (UAV), the undesired oscillations of the position and the orientation associated with the UAV representing an unknown position and an unknown orientation of the UAV during an optimization time, wherein the UAV comprises the RIS; and steering, based on the RIS parameters and by the RIS of the UAV, a signal reflection associated with a signal beam to a target area, wherein the signal beam is from a transmitter.

16. The method of claim 1, wherein the optimization algorithm generates a statistical representation associated with the position and the orientation associated with the UAV using UAV statistics of the UAV, and uses the statistical representation to optimize the RIS configuration and counteract potential misalignment in a reflected beam at the RIS.

* * * * *